US011403825B2

(12) United States Patent
Tajik

(10) Patent No.: US 11,403,825 B2
(45) Date of Patent: Aug. 2, 2022

(54) MIXED REALITY MUSICAL INSTRUMENT

(71) Applicant: Magic Leap, Inc., Plantation, FL (US)

(72) Inventor: Anastasia Andreyevna Tajik, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 123 days.

(21) Appl. No.: 16/970,323

(22) PCT Filed: Feb. 15, 2019

(86) PCT No.: PCT/US2019/018366
§ 371 (c)(1),
(2) Date: Aug. 14, 2020

(87) PCT Pub. No.: WO2019/161312
PCT Pub. Date: Aug. 22, 2019

(65) Prior Publication Data
US 2021/0082191 A1    Mar. 18, 2021

Related U.S. Application Data

(60) Provisional application No. 62/631,405, filed on Feb. 15, 2018.

(51) Int. Cl.
*G06T 19/00* (2011.01)
*G06T 7/70* (2017.01)
(Continued)

(52) U.S. Cl.
CPC .............. *G06T 19/006* (2013.01); *G06T 7/70* (2017.01); *G10H 1/0008* (2013.01);
(Continued)

(58) Field of Classification Search
None
See application file for complete search history.

(56) References Cited

U.S. PATENT DOCUMENTS 8,831,255 B2    9/2014  Crawford
9,183,676 B2    11/2015 Mcculloch
(Continued)

FOREIGN PATENT DOCUMENTS

CN    102902355 A    1/2013
CN    103201731 A    7/2013
(Continued)

OTHER PUBLICATIONS

Chines Office Action dated May 11, 2021, for CN Application No. 201980012935.2, with English Translation, 14 pages.
(Continued)

*Primary Examiner* — Nicholas R Wilson
(74) *Attorney, Agent, or Firm* — Morrison & Foerster LLP

(57) ABSTRACT

A method is disclosed, the method comprising the steps of identifying a first real object in a mixed reality environment, the mixed reality environment having a user; identifying a second real object in the mixed reality environment; generating, in the mixed reality environment, a first virtual object corresponding to the second real object; identifying, in the mixed reality environment, a collision between the first real object and the first virtual object; determining a first attribute associated with the collision; determining, based on the first attribute, a first audio signal corresponding to the collision; and presenting to the user, via one or more speakers, the first audio signal.

20 Claims, 18 Drawing Sheets

(51) Int. Cl.
*G10H 1/00* (2006.01)
*H04S 7/00* (2006.01)

(52) U.S. Cl.
CPC ........... *G10H 1/0066* (2013.01); *H04S 7/304* (2013.01); *G10H 2210/325* (2013.01); *H04S 2400/11* (2013.01)

(56) References Cited

U.S. PATENT DOCUMENTS

| | | | |
|---|---|---|---|
| 9,418,479 | B1 | 8/2016 | Worley, III et al. |
| 2002/0005108 | A1 | 1/2002 | Ludwig |
| 2013/0286004 | A1* | 10/2013 | McCulloch ........... G06T 19/006 345/419 |
| 2016/0212272 | A1 | 7/2016 | Srinivasan |
| 2019/0116448 | A1 | 4/2019 | Schmidt |
| 2021/0195360 | A1 | 6/2021 | Leider et al. |
| 2021/0248803 | A1 | 8/2021 | Kojima et al. |
| 2021/0375257 | A1 | 12/2021 | Tajik et al. |

FOREIGN PATENT DOCUMENTS

| | | |
|---|---|---|
| WO | 2012074528 A1 | 6/2012 |
| WO | 2018026828 A1 | 2/2018 |
| WO | 2018224847 A2 | 12/2018 |
| WO | 2021243098 A1 | 12/2021 |

OTHER PUBLICATIONS

International Search Report and Written Opinion, dated Aug. 31, 2021, for PCT Application No. PCT/US2021/34639, filed May 27, 2021, fourteen pages.

International Preliminary Report on Patentability dated Aug. 18, 2020, for PCT Application No. PCT/US2019/018366, filed Feb. 15, 2019, six pages.

Chines Office Action dated Dec. 3, 2021, for CN Application No. 201980012935.2, with English Translation, 12 pages.

Notice of Allowance dated Mar. 7, 2022, for U.S. Appl. No. 17/127,204, filed Dec. 18, 2020, nine pages.

Chines Office Action dated Mar. 22, 2022, for CN Application No. 201980012935.2, with Engiish translation, 18 pages.

* cited by examiner

MIXED REALITY MUSICAL INSTRUMENT

CROSS REFERENCE TO RELATED APPLICATIONS

This application is a national stage application under 35 U.S.C. § 371 of International Application No. PCT/US2019/018366, filed internationally on Feb. 15, 2019, which claims the benefit under 35 U.S.C. § 119(e) of U.S. Provisional Patent Application No. 62/631,405, filed Feb. 15, 2018, the contents of which are incorporated by reference in their entirety.

FIELD

This disclosure relates in general to systems and methods for presenting audio signals, and in particular to systems and methods for presenting audio signals corresponding to musical instruments in a mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. This disclosure contemplates a distinction between VR, AR, and MR systems (although some systems may be categorized as VR in one aspect (e.g., a visual aspect), and simultaneously categorized as AR or MR in another aspect (e.g., an audio aspect)). As used herein, VR systems present a virtual environment that replaces a user's real environment in at least one aspect; for example, a VR system could present the user with a view of the virtual environment while simultaneously obscuring his or her view of the real environment, such as with a light-blocking head-mounted display. Similarly, a VR system could present the user with audio corresponding to the virtual environment, while simultaneously blocking (attenuating) audio from the real environment.

VR systems may experience various drawbacks that result from replacing a user's real environment with a virtual environment. One drawback is a feeling of motion sickness that can arise when a user's field of view in a virtual environment no longer corresponds to the state of his or her inner ear, which detects one's balance and orientation in the real environment (not a virtual environment). Similarly, users may experience disorientation in VR environments where their own bodies and limbs (views of which users rely on to feel "grounded" in the real environment) are not directly visible. Another drawback is the computational burden (e.g., storage, processing power) placed on VR systems which must present a full 3D virtual environment, particularly in real-time applications that seek to immerse the user in the virtual environment. Similarly, such environments may need to reach a very high standard of realism to be considered immersive, as users tend to be sensitive to even minor imperfections in virtual environments—any of which can destroy a user's sense of immersion in the virtual environment. Further, another drawback of VR systems is that such applications of systems cannot take advantage of the wide range of sensory data in the real environment, such as the various sights and sounds that one experiences in the real world. A related drawback is that VR systems may struggle to create shared environments in which multiple users can interact, as users that share a physical space in the real environment may not be able to directly see or interact with each other in a virtual environment.

As used herein, AR systems present a virtual environment that overlaps or overlays the real environment in at least one aspect. For example, an AR system could present the user with a view of a virtual environment overlaid on the user's view of the real environment, such as with a transmissive head-mounted display that presents a displayed image while allowing light to pass through the display into the user's eye. Similarly, an AR system could present the user with audio corresponding to the virtual environment, while simultaneously mixing in audio from the real environment. Similarly, as used herein, MR systems present a virtual environment that overlaps or overlays the real environment in at least one aspect, as do AR systems, and may additionally allow that a virtual environment in an MR system may interact with the real environment in at least one aspect. For example, a virtual character in a virtual environment may toggle a light switch in the real environment, causing a corresponding light bulb in the real environment to turn on or off. As another example, the virtual character may react (such as with a facial expression) to audio signals in the real environment. By maintaining presentation of the real environment, AR and MR systems may avoid some of the aforementioned drawbacks of VR systems; for instance, motion sickness in users is reduced because visual cues from the real environment (including users' own bodies) can remain visible, and such systems need not present a user with a fully realized 3D environment in order to be immersive. Further, AR and MR systems can take advantage of real world sensory input (e.g., views and sounds of scenery, objects, and other users) to create new applications that augment that input.

XR systems may provide the user with various ways in which to interact with a virtual environment; for example, XR systems may include various sensors (e.g., cameras, microphones, etc.) for detecting a user's position and orientation, facial expressions, speech, and other characteristics; and present this information as input to the virtual environment. Some XR systems may incorporate a sensor-equipped input device, such as a virtual "mallet," a real mallet, a contact sensor, a finger sensor, and the like, and may be configured to detect a position, orientation, or other characteristic of the input device.

XR systems can offer a uniquely heightened sense of immersion and realism by combining virtual visual and audio cues with real sights and sounds. Accordingly, it is desirable in some XR systems to present a virtual environment that enhances, improves, or alters a corresponding real environment. This disclosure relates to XR systems that incorporate interactive virtual sound sources, such as musical instruments, that present a user with an audio signal corresponding to an interaction between a real object in a real environment and a virtual object in a virtual environment.

BRIEF SUMMARY

Examples of the disclosure describe systems and methods for presenting an audio signal to a user of a mixed reality environment. In one example, a method can identify a first real object and a second real object in the mixed reality environment. The method can generate a virtual object corresponding to the second real object. The method can then identify, in the mixed reality environment, a collision between the first real object and the virtual object. The method can determine a first attribute associated with the collision, and determine, based on the first attribute, a first audio signal corresponding to the collision. The method can then present to the user, via one or more speakers, the first audio signal.

DETAILED DESCRIPTION

Figure 1A:
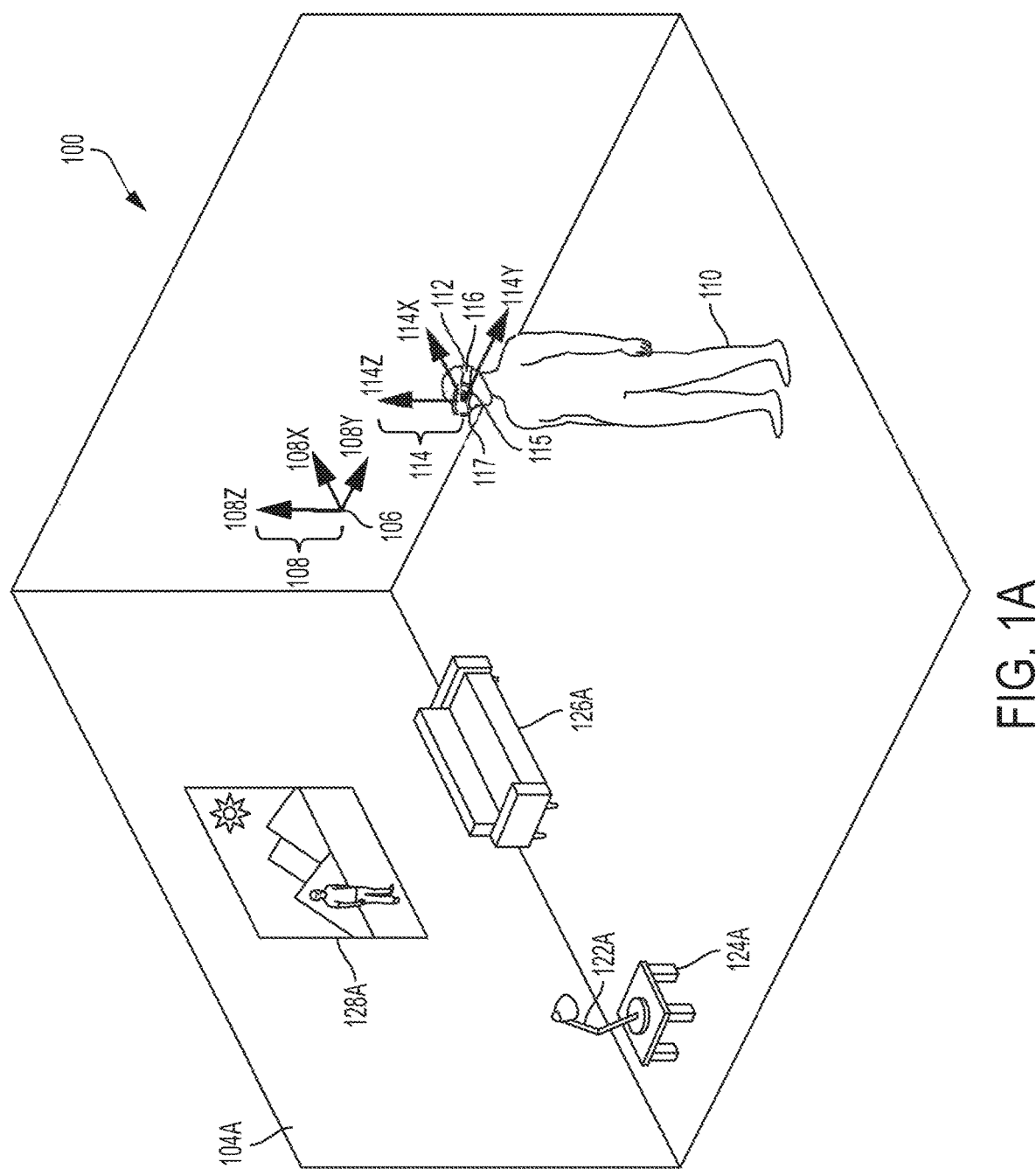
FIGS. 1A-1C illustrate an example mixed reality environment.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time $t0$, based on data associated with the virtual environment and/or input provided by a user, a state of the virtual environment at a second time $t1$. For instance, if an object in the virtual environment is located at a first coordinate at time $t0$, and has certain programmed physical parameters (e.g., mass, coefficient of friction); and an input received from user indicates that a force should be applied to the object in a direction vector; the processor can apply laws of kinematics to determine a location of the object at time $t1$ using basic mechanics. The processor can use any suitable information known about the virtual environment, and/or any suitable input, to determine a state of the virtual environment at a time $t1$. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener"

coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment 100 in which a user 110 uses a mixed reality system 112. Mixed reality system 112 may comprise a display (e.g., a transmissive display) and one or more speakers, and one or more sensors (e.g., a camera), for example as described below. The real environment 100 shown comprises a rectangular room 104A, in which user 110 is standing; and real objects 122A (a lamp), 124A (a table), 126A (a sofa), and 128A (a painting). Room 104A further comprises a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
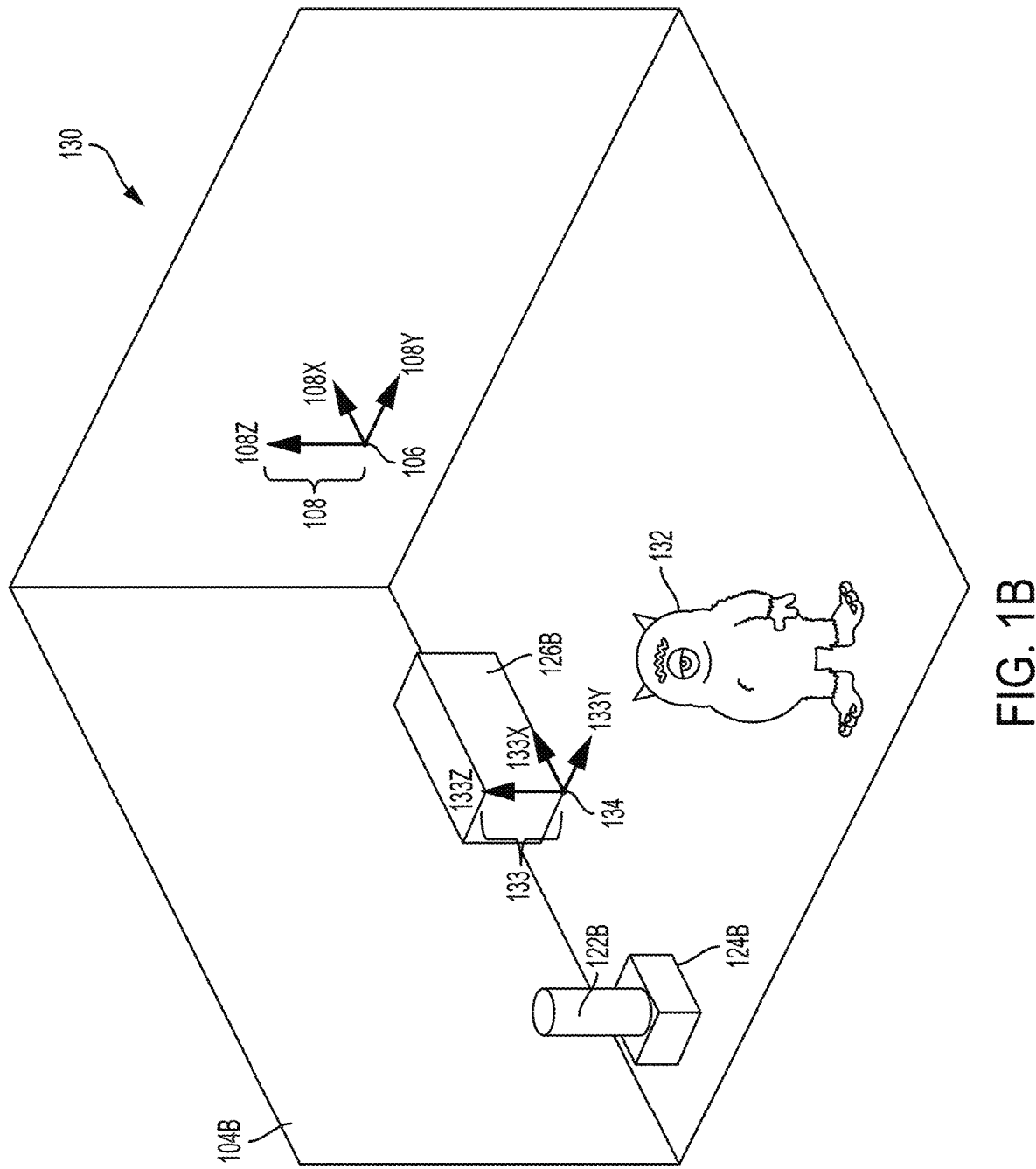

FIG. 1B illustrates an example virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally comprises a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
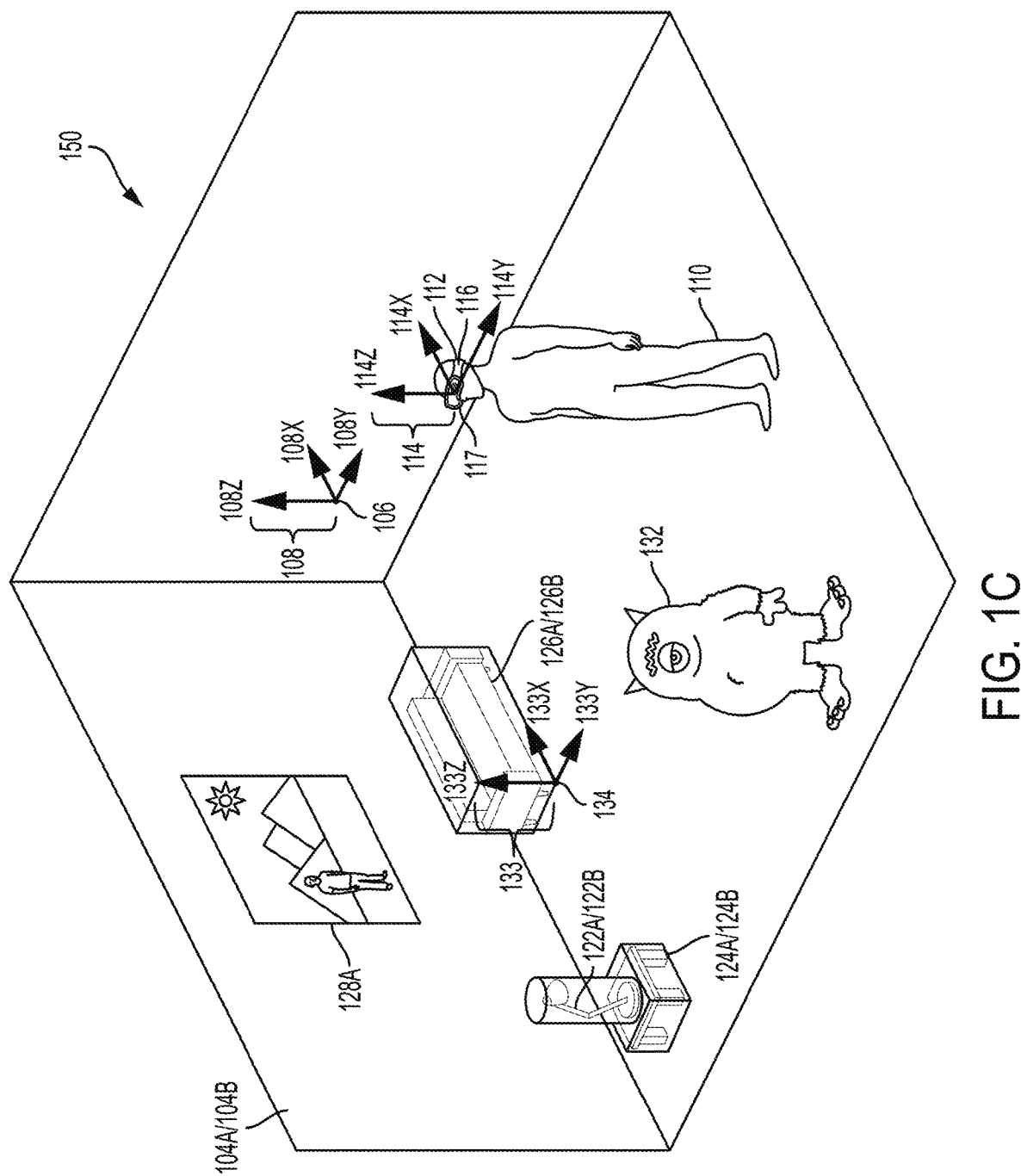

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU)(e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2A:
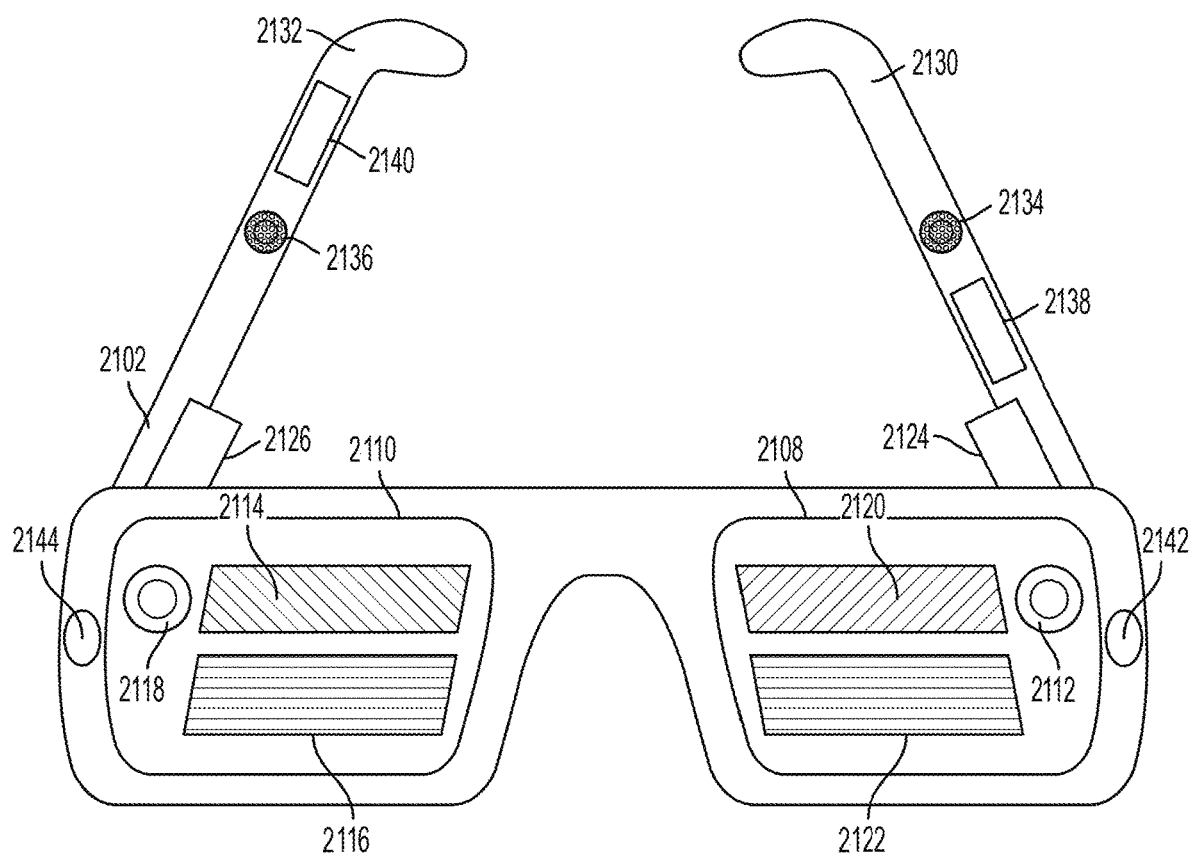
FIGS. 2A-2D illustrate components of an example mixed reality system that can be used to generate and interact with a mixed reality environment.
Figure 2B:
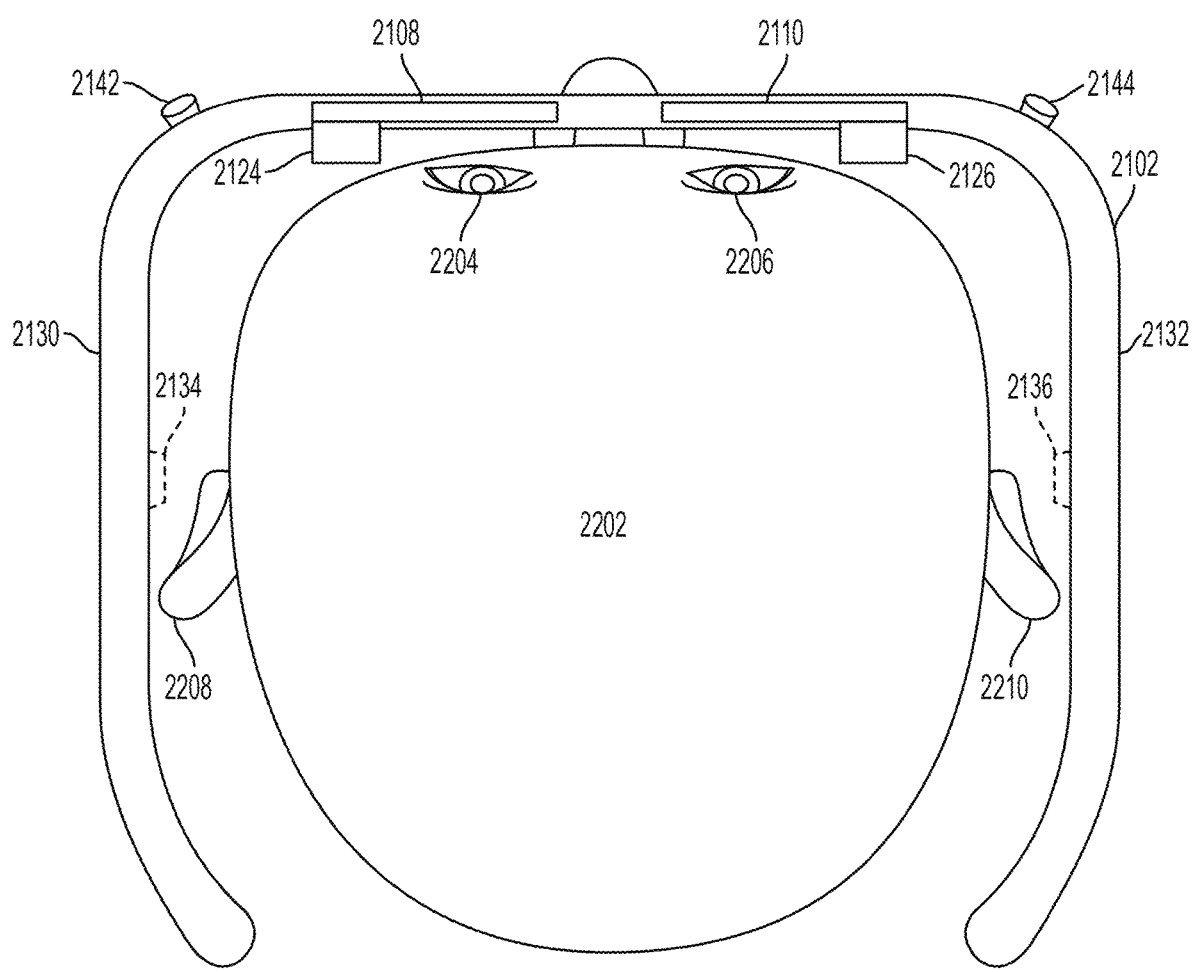
Figure 2C:
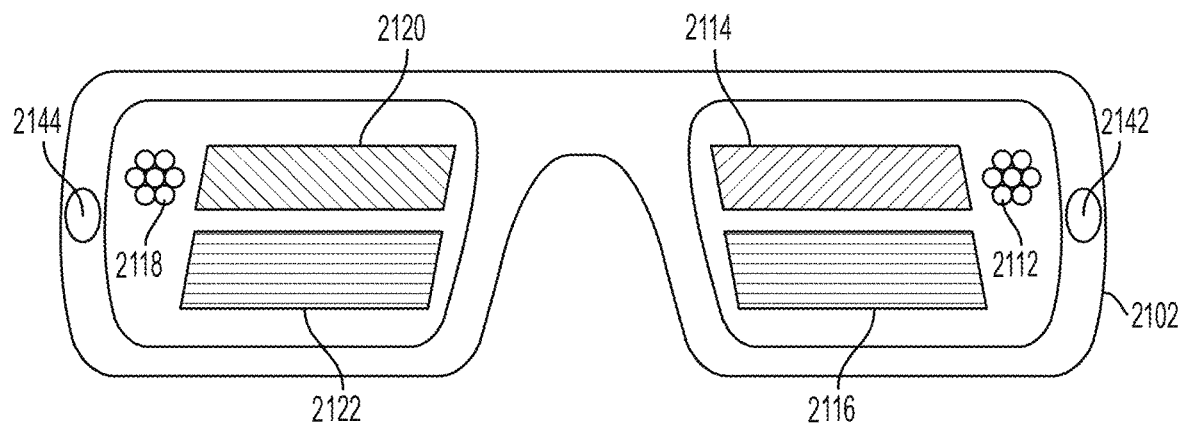
Figure 2D:
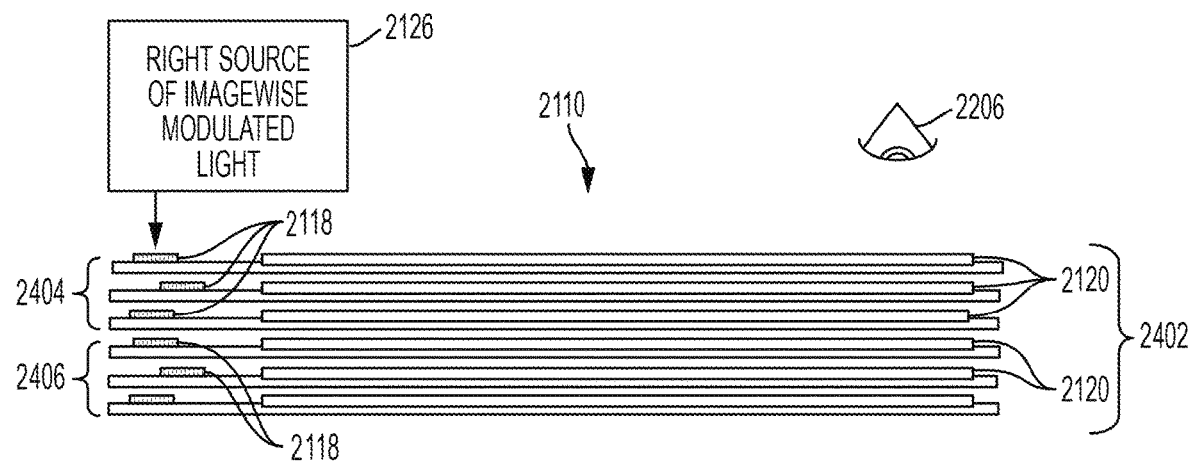

FIGS. 2A-2D illustrate components of an example mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
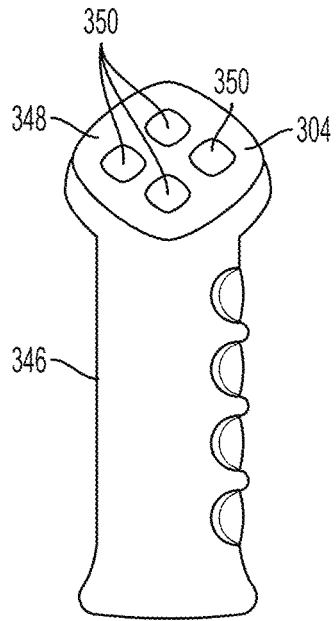
FIG. 3A illustrates an example mixed reality handheld controller that can be used to provide input to a mixed reality environment.

FIG. 3A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
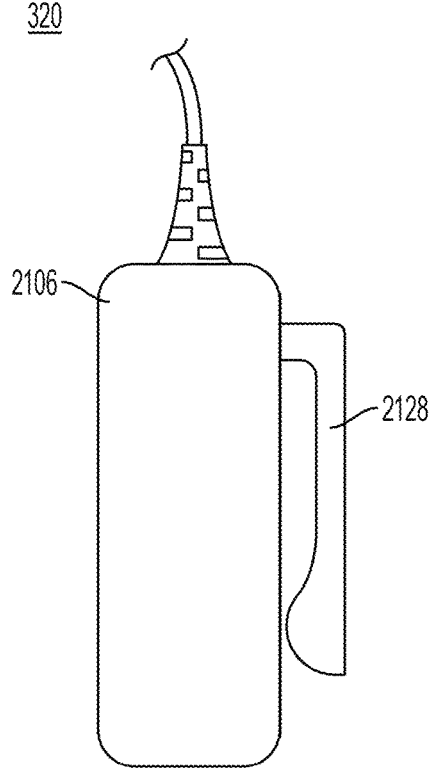
FIG. 3B illustrates an example auxiliary unit that can be used with an example mixed reality system.

FIG. 3B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
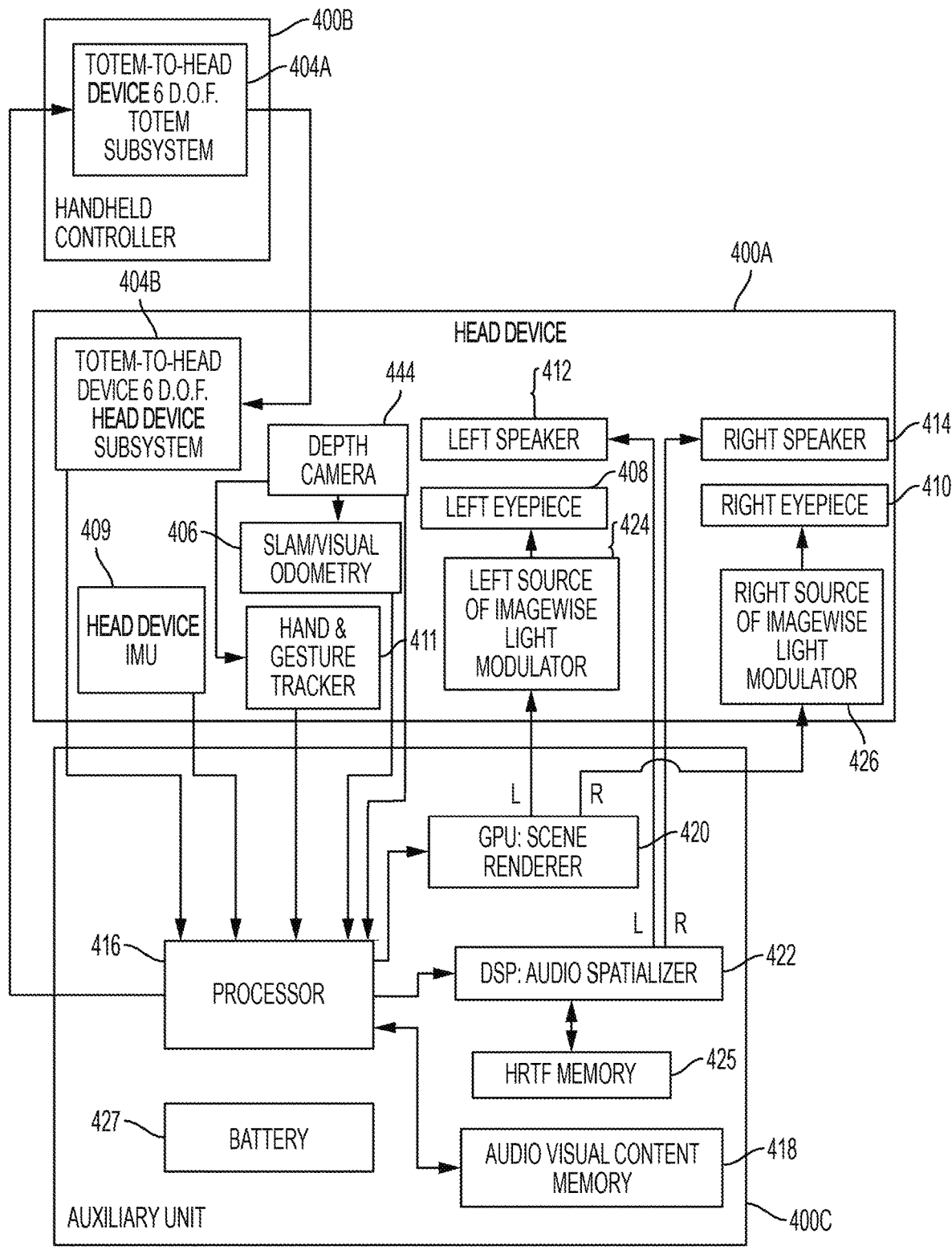
FIG. 4 illustrates an example functional block diagram for an example mixed reality system.

FIG. 4 shows an example functional block diagram that may correspond to an example mixed reality system, such as mixed reality system 200 described above (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Mixed Reality Musical Instruments

The present invention relates to using a MRE to interact with a real object as if it were a musical instrument. That is, according to the invention, when a user physically interacts with a real object in a MRE, such as by blowing on it or striking it with one's hand (or with an object such as a musical instrument striker), the MRE presents the user with an audio signal corresponding not to the sonic response of the real object, but to the sonic characteristics of a musical instrument. This interactive behavior could be beneficial in, for example, applications related to gaming; music creation; education; and social interaction. Such real objects may include any suitable real object that a user can interact with—for example, a natural object (e.g., a tree branch or a rock); a man-made object (e.g., a cooking pot, a rubber band); a two-dimensional drawing (e.g., a sketch of a xylophone on a sheet of paper); or a living object or body part (e.g., an arm or leg, including an arm or leg of the user). Similarly, musical instruments could include any suitable instrument that generates a sound, such as a percussion instrument (e.g., a drum, a xylophone); a string instrument (e.g., a guitar, and including string instruments with percussive interfaces, such as pianos); a brass or woodwind instrument (e.g., a tuba, a clarinet); or an electronic instrument (e.g., an analog synthesizer). In some examples, musical instruments could also include sound generators not conventionally thought of as musical instruments, such as machinery (e.g., motorcycle engines) or animals (e.g., songbirds).

Many real objects in our everyday lives already bear some resemblance to, or share certain characteristics with, musical instruments. Drums, for instance, tend to be cylindrical in shape; playing a drum involves striking a drum head much as one might strike a surface of any other cylindrical object, such as an overturned bucket; and the sound of a drum, which is generated by vibrations of a drum shell and drum heads, may resemble the sound of striking a bucket, which is similarly generated by vibrations of the bucket. Likewise, plucking a guitar string may involve the same motions as plucking a rubber band, and a xylophone might visually resemble a series of wooden boards. Further, a piano keyboard may visually resemble a sketch of a keyboard drawn on a sheet of paper. The present invention takes advantage of these similarities between everyday objects and musical instruments; for example, upon striking an elongated box and hearing the sound of a xylophone, the user may immediately, in his or her mind, connect the sound of the xylophone with the striking of the elongated box, because of the visual and physical similarities between the two. The resulting effect may be visceral and immersive, evoking the experience of playing an actual xylophone. Further, in some examples, the present invention may make use of one or more actual physical characteristics of a real object (shape, dimensions, materials, etc.) to generate a sound influenced by those physical characteristics. Alternatively, the real component of the mixed reality musical instrument may bear little resemblance to the virtual component of the musical reality instrument. For example, the virtual component can be a xylophone and the real component can be a table top. In certain implementations the real component of the mixed reality musical instrument performs the beneficial function of providing haptic feedback to the user wielding a musical instrument striker (e.g., mallet, drumstick, snare brush). In addition, the present invention may make use of parameters of an interaction with a real object—for example, the location or velocity with which a user strikes the object—to modulate the sound to correspond to those parameters. These features further enhance a feeling of immersion and connectedness when engaging with a MRE.

As described further below, presenting an audio signal corresponding to a virtual musical instrument in a MRE can comprise three processes: a first process of creating a mixed reality musical instrument that includes a virtual component and a real object component; a second process of detecting and processing user interaction with the mixed reality musical instrument; and a third process of generating audio based on the user interaction with the mixed reality instrument.

Creating a Mixed Reality Musical Instrument

Figure 5:
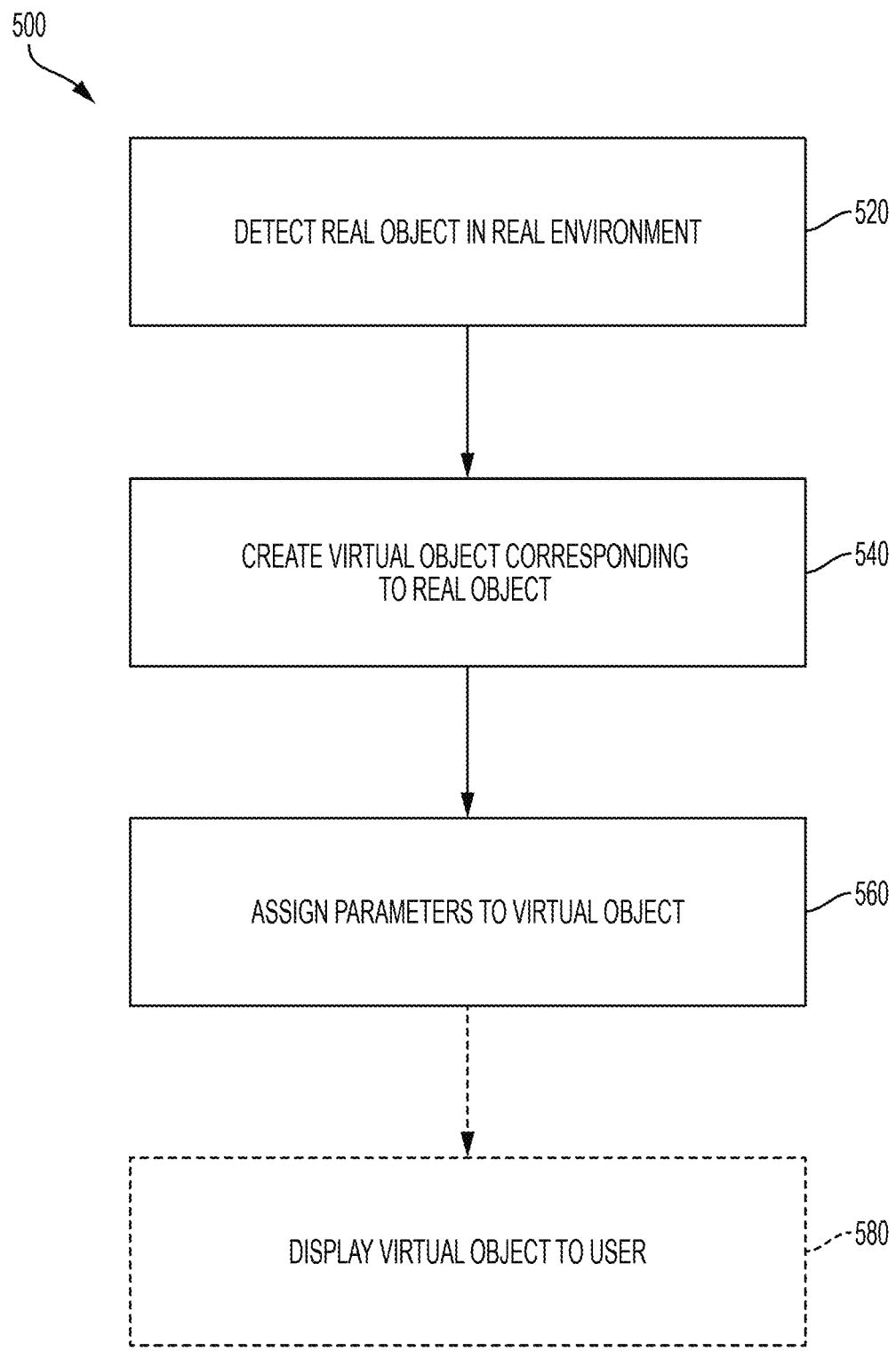
FIG. 5 illustrates an example flow chart of a process for creating a mixed reality musical instrument that includes a real object in a mixed reality system.

FIG. 5 illustrates an example process 500 of creating a virtual musical instrument corresponding to a real object in a MRE (e.g., MRE 150 described above with respect to FIG. 1). At stage 520, a real object can be detected, for example using depth cameras 142, 144. In some embodiments, the real object may be detected via one or more cameras (e.g., depth cameras, RGB cameras, RGBD cameras, etc.) external to a mixed reality system. The one or more cameras may be, for example, on a camera rig. At stage 540, a virtual object can be created (e.g., by circuitry, such as a processor and/or a memory, of mixed reality system 112) to correspond to the real object. At stage 560, one or more instrument parameters can be associated with the virtual object; the instrument parameters can define the behavior of the virtual object as a virtual musical instrument that can be used to generate or process an audio signal. In some examples, at stage 580, a visual representation of the virtual object can be presented to a user of the MRE. Stages 520, 540, 560, and 580 of process 500 are described in more detail below.

Figure 6A:
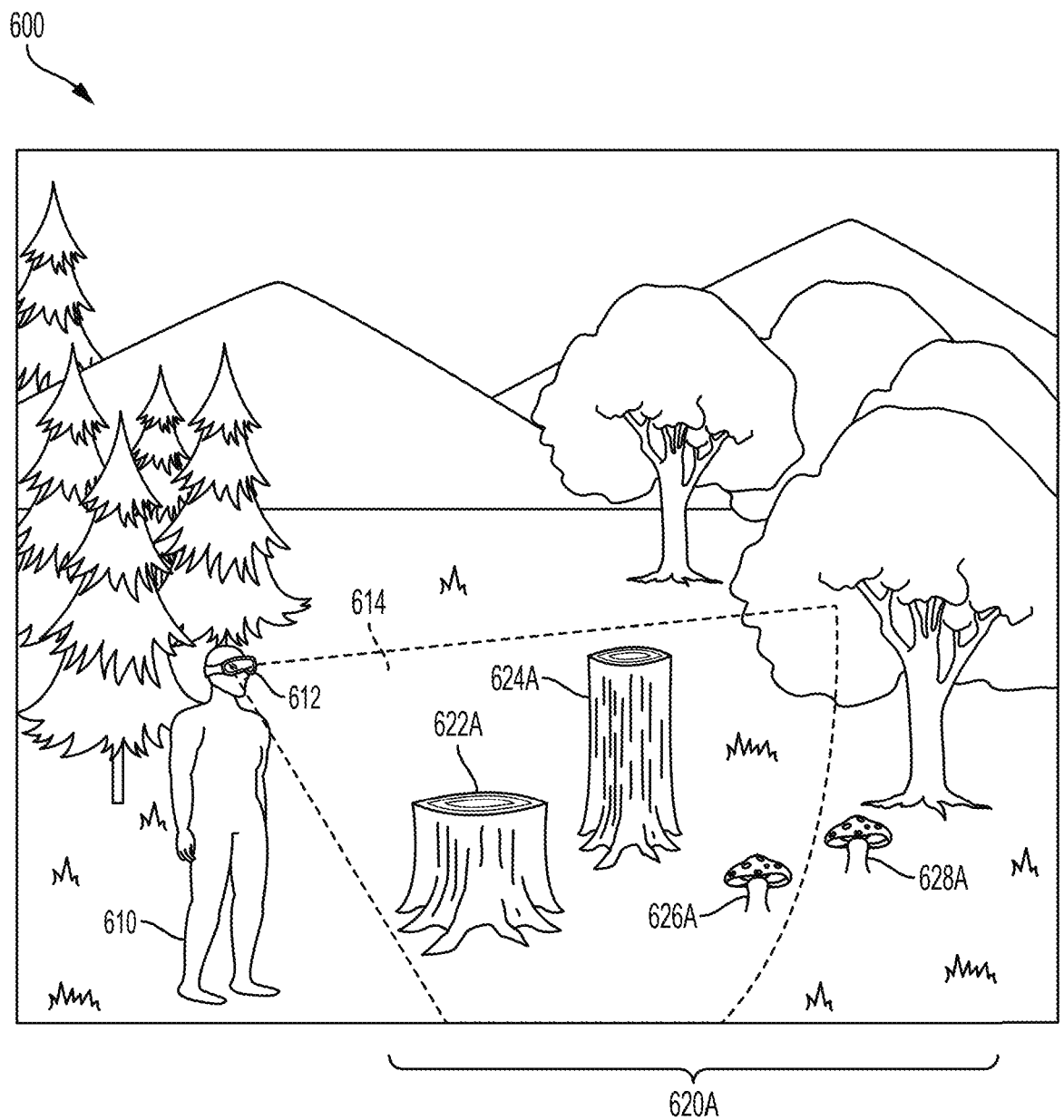
FIG. 6A illustrates an example real environment of a user of a mixed reality system.
Figure 6B:
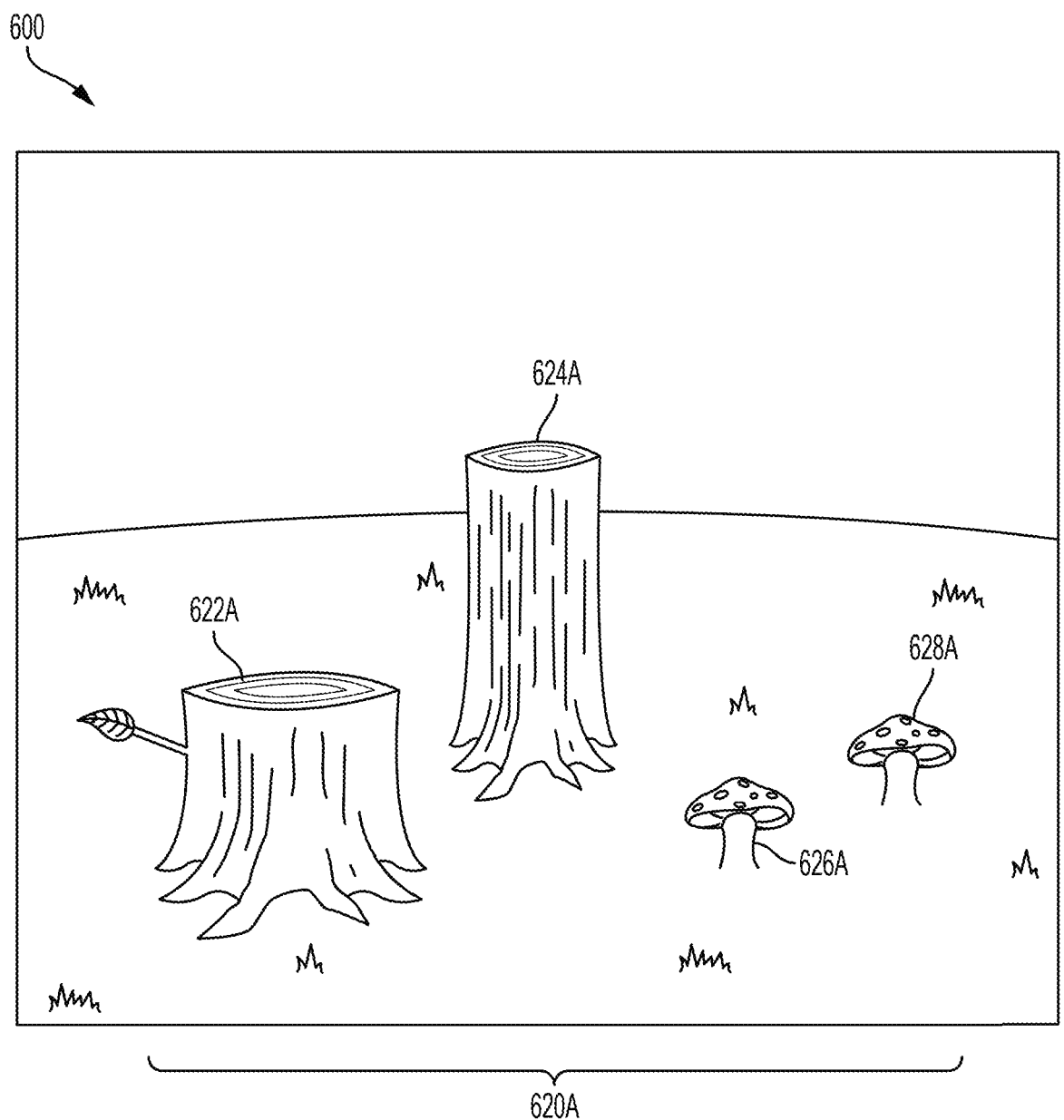
FIG. 6B illustrates an example view of real objects in a mixed reality system.
Figure 6C:
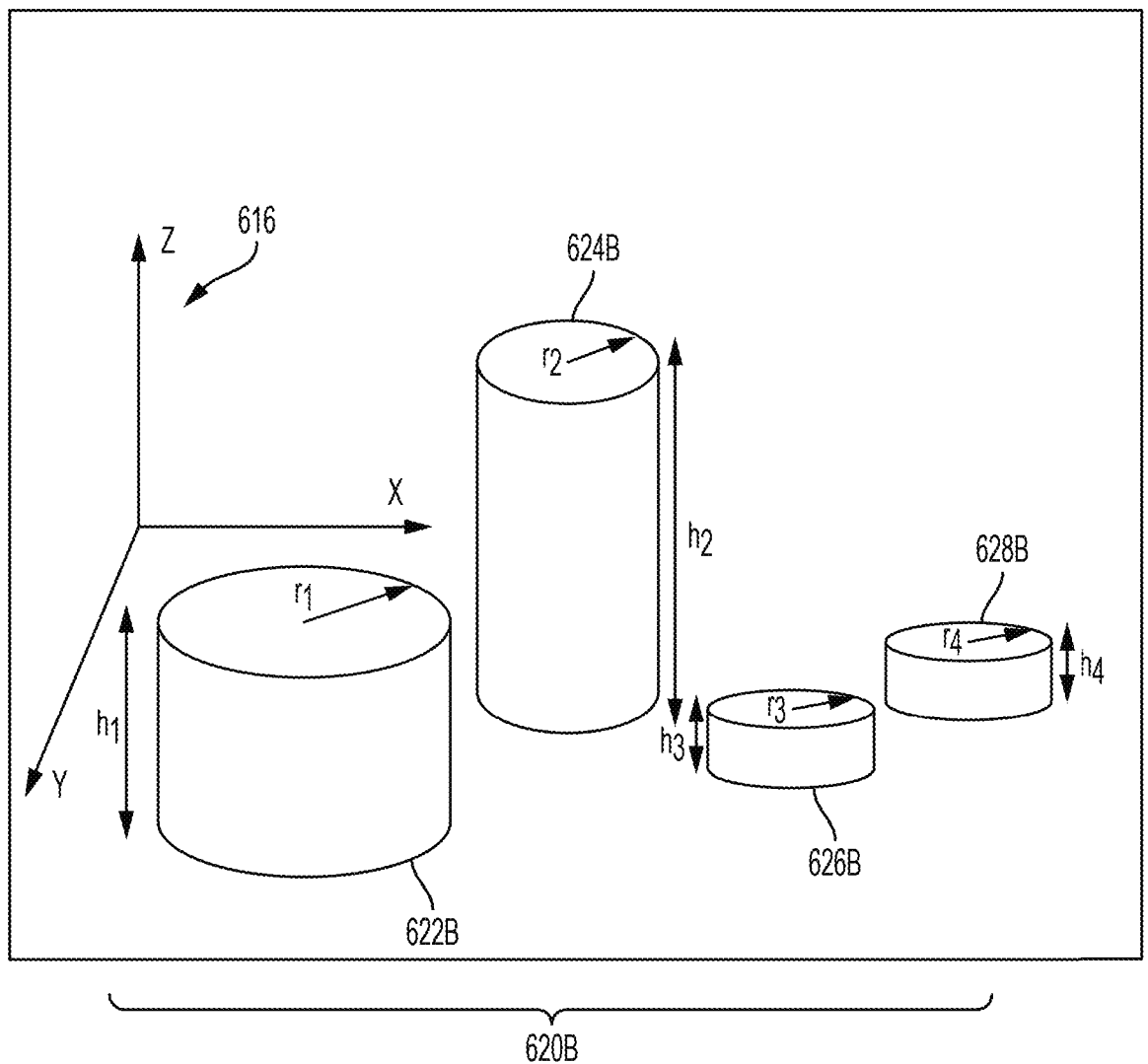
FIG. 6C illustrates example virtual objects corresponding to real objects in an example mixed reality system.

FIGS. 6A-6C illustrate an example of creating a virtual musical instrument corresponding to a real object in a MRE, according to the example process 500 described above with respect to FIG. 5. FIG. 6A shows a user 610 of a mixed reality system 612 (which may correspond to user 110 and mixed reality system 112 in FIG. 1, respectively). User 610 exists in a real environment 600 (e.g., a forest) that includes real objects, such as real objects 620A (which include tree stump 622A, tree stump 624A, mushroom 626A, and mushroom 628A). As described above with respect to mixed reality system 100, while user 610 exists in real environment 600, mixed reality system 612 may present user 610 (e.g., via a display and/or one or more speakers) with a MRE incorporating real environment 600. In the example shown, the real environment 600 can be detected by one or more cameras (or other suitable sensors). In some embodiments, the one or more cameras may be a part of mixed reality system 612 and may have a field of view 614. In some embodiments, the one or more cameras may be external to mixed reality system 612. In the example shown, mixed reality system 612 may have no prior "knowledge" of real objects 620A in advance of user 610 encountering them in real environment 600. (However, in some examples, mixed reality system 612 may have some prior knowledge of real objects 620A; for example, a memory of the device may be preprogrammed with the locations of real objects 620A.) As described above, user 610 may wish to interact with real objects 620A as if they were musical instruments; for example, user 610 may wish to strike tree stumps 622A and 624A, and mushrooms 626A and 628A, as one would a percussion instrument (e.g., a drum set comprising one or more drums). Mixed reality system 612 can enhance this example interaction with real objects 620A by presenting user 610 with audio signals and/or visual cues to create the illusion that user 610 is interacting with actual drums—not with ordinary objects. For instance, as described below, as user 610 strikes one of real objects 620A, mixed reality system 612 can concurrently present user 610 with an audio signal corresponding to a virtual drum based on the real object.

FIG. 6B shows an example view of real environment 600, corresponding to field of view 614, as it may be detected by mixed reality system 612 (for example, at stage 520 of process 500). As shown in FIG. 6B, mixed reality system 612 can detect real objects 620A in real environment 600. In some examples, mixed reality system 612 can make use of one or more cameras to detect an image of real objects 620A. However, as described above, any suitable combination of one or more sensors can be used to detect real objects 620A. For instance, mixed reality system 612 can make use of LIDAR units; accelerometers; acoustic sensors; infrared sensors; GPS units; or any other suitable sensor. In some embodiments the sensors used to detect real object 620A may be external to mixed reality system 612.

After detecting real objects 620A, mixed reality system 612 can generate one or more virtual objects in a virtual environment of a MRE (for example, at stage 540 of process 500); these virtual objects may correspond to, and represent, real objects 620A. Mixed reality system 612 may maintain and update a state of the MRE, as described above. As described above, such as with respect to stage 560 of process 500, a mixed reality system (e.g., via a processor or other circuitry) can associate one or more parameters (e.g., position, orientation, shape) with a virtual object, and can perform one or more operations with respect to a virtual object in a MRE. As examples, mixed reality system 612 can receive input directed at a virtual object in a MRE (e.g., sense user interaction with the virtual object); identify interactions between virtual objects; generate and/or present a display (e.g., a polygon model and/or one or more textures) corresponding to a virtual object in a MRE; and generate and/or present an audio signal corresponding to a virtual object in a MRE. Mixed reality system 612 may further execute software (e.g., scripts written in a scripting language) performing operations affecting a virtual object in a MRE. Accordingly, mixed reality system 612 can give interactive qualities to the virtual object, such as by identifying that a user is touching or otherwise interacting with a corresponding real object.

FIG. 6C shows example virtual objects 620B that correspond to real objects 620A in a MRE 601 having a coordinate space 616 (which may correspond to coordinate space 108 described above with respect to FIGS. 1A-1C, and is suitably fixed in an inertial reference frame of the real environment 600). Virtual objects 622B, 624B, 626B, and 628B (collectively 620B) correspond to real objects 622A, 624A, 626A, and 628A (collectively 620A), respectively. A virtual object (e.g., virtual object 622B) can have one or more parameters based on a corresponding real object (e.g., tree stump 622A). Such parameters can include spatial properties in a coordinate space of a MRE (e.g., position, orientation, shape, dimensions); visual properties (e.g., color, transparency, reflectivity); physical properties (e.g., density; elasticity; tensile strength; temperature; smoothness; wetness; resonance; electrical conductivity); or other suitable properties of an object. Mixed reality system 612 can determine such parameters, and accordingly generate virtual objects 620B having those parameters, using any suitable method. For instance, mixed reality system 612 could use a combination of camera data and LIDAR data to identify a position coordinate (in the MRE) at which a base point of tree stump 622A is located, and an orientation vector corresponding to an orientation of tree stump 622A in the MRE. As additional examples, mixed reality system 612 could use conventional shape recognition methods, applied to sensor data (e.g., camera data, LIDAR data), to identify that tree stump 622A is generally cylindrical in shape; that tree stump 622A could correspond generally to a cylinder of radius 16.5 inches and height 28.0 inches; and that tree stump 622A is opaque and brown in color (e.g., corresponding to an RGBA vector of <140, 70, 20, 0>). Similarly, in some examples, mixed reality system 612 may identify a material (e.g., oak) associated with tree stump 622A. Mixed reality system 612 can accordingly create a virtual object 622B, and set parameters associated with that virtual object (e.g., general parameters 710 described below) to correspond to these values. As shown in FIG. 6C, each of the virtual objects 620B (including virtual object 622B) is represented as a cylinder having a respective height and radius, which can correspond to the roughly cylindrical shapes of their corresponding real objects 620A; further, each of virtual objects 620B is located in coordinate space 616 at a position and orientation corresponding to its respective real object 620A.

Figure 7:
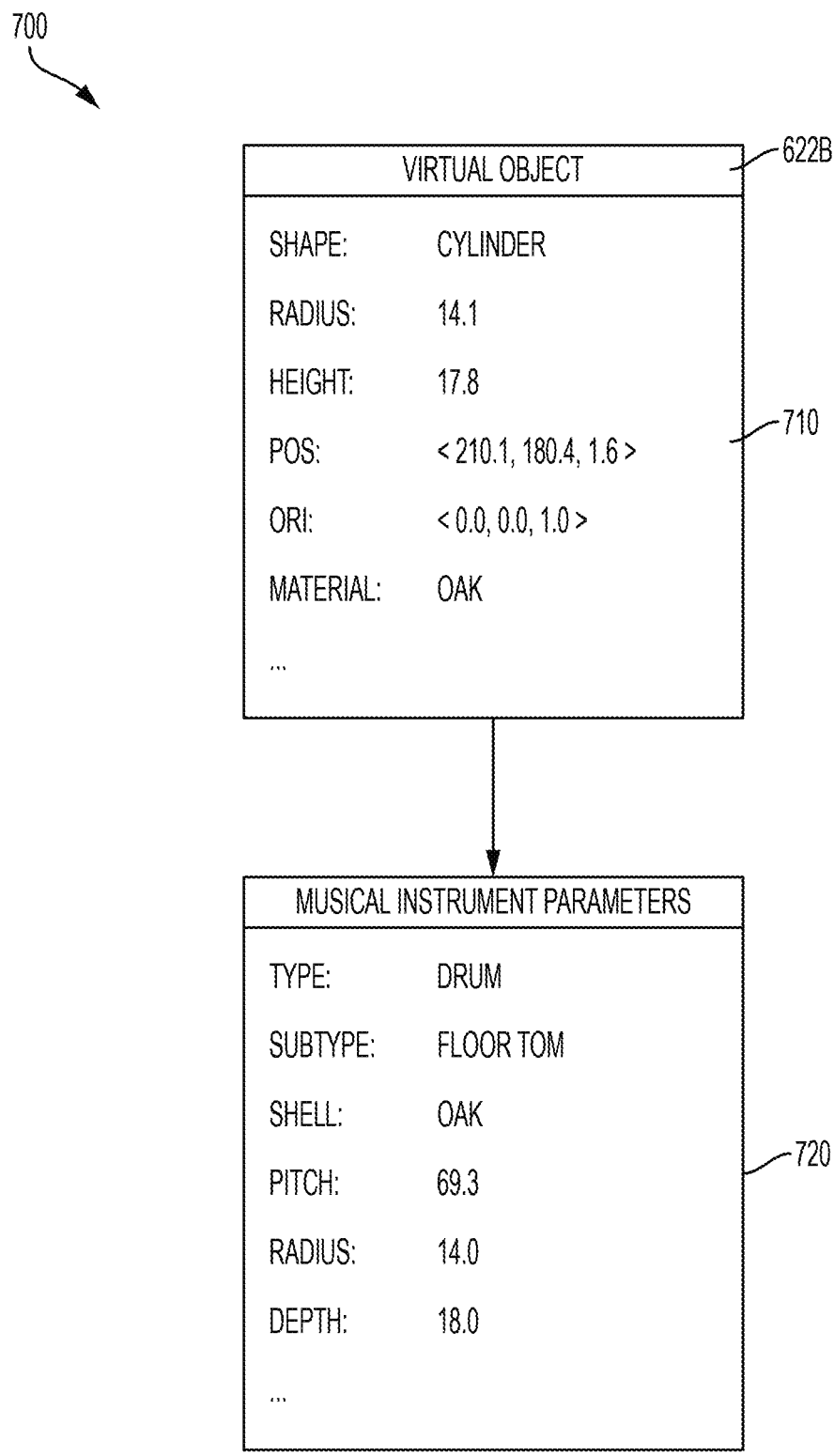
FIG. 7 illustrates an example representation of parameters of a virtual object in a mixed reality system.

FIG. 7 shows an example data representation 700 of parameters, such as the parameters described above, associated with example virtual object 622B, which corresponds to real object 622A. In some examples, data representation 700 may correspond to an instance of a class (e.g., a class defining a musical instrument and inheriting from a class describing a more general virtual object); however, any suitable implementation of data representation 700 may be used. In the example shown, general parameters 710 (which can correspond to general parameters of a virtual object) indicate that virtual object 622B is associated with a cylinder shape; a radius of 16.5 inches; a height of 28.0 inches; a position coordinate (e.g., in coordinate space 616) of <210.1, 180.4, 1.6>; an orientation vector of <0.0, 0.0, 1.0>; and an oak material. General parameters 710 may also include additional parameters not shown.

In some examples, such as shown in FIG. 7, one or more musical instrument parameters 720 may be associated with a virtual object, such as virtual object 622B. Musical instrument parameters may be used to generate or modify an audio signal associated with the virtual object, as described below. In some embodiments, a user may select and adjust the one or more musical instrument parameters 720 associated with a virtual object. In FIG. 7, musical instrument parameters 720 indicate that the virtual object corresponds to a musical instrument type of "Drum"; a musical instrument subtype of "Floor Tom"; a shell material type of "Oak"; a pitch of 69.3 Hz (corresponding to the note 2C#); a radius of 14.0 inches; and a depth of 18.0 inches.

In some examples, mixed reality system 612 can derive one or more of musical instrument parameters 720 from general parameters 710, from sensor data (e.g., detected from a camera or a microphone), and/or from user input. For instance, mixed reality system 612 could determine from general parameters 710 related to the shape of virtual object 622B (e.g., that virtual object 622B is cylindrical, has an oak material, and is oriented vertically) that virtual object 622B most closely resembles a floor tom-type drum (e.g., compared to other musical instruments); accordingly, mixed reality system 612 could set musical instrument parameters to reflect that virtual object 622B has a musical instrument type of "Drum," with a subtype of "Floor Tom," and a shell material of "Oak." Similarly, mixed reality system 612 can determine, from general parameters 710 indicating that virtual object 622B has a radius of 14.1 inches and a height of 17.8 inches, that virtual object 622B can correspond to a drum having a radius of 14.0 inches and a depth of 18.0 inches (14.0 inches and 18.0 inches are standard sizes for a floor tom radius and depth; mixed reality system 612 could determine that these are the standard floor tom sizes closest to the dimensions of virtual object 622B). Further, mixed reality system 612 can determine, based for example on the dimensions and materials corresponding to virtual object 622B, that if played as a drum, virtual object 622B could resonate at a base/fundamental frequency (pitch) of 69.3 Hz. Mixed reality system 612 can accordingly set musical instrument parameters 720 to reflect these determined values.

In the above example, parameters 700 are shown as discrete values (e.g., a pitch of 69.3 Hz). However, in some examples, parameters 700 may include a function, rather than a discrete value. For instance, while some virtual musical instruments (e.g., corresponding to drums) generate a fixed pitch, other virtual musical instruments (e.g., pianos) generate a pitch that depends on one or more input parameters (e.g., which piano key is pressed). A musical instrument parameter for such an instrument could represent a pitch as a function of those input parameters, reflecting that the pitch associated with that virtual musical instrument will depend on those input parameters.

In the above example, musical instrument parameters 720 for virtual object 622B were selected to approximate general parameters 710 (which in turn could be selected to approximate the characteristics of the corresponding real object). However, in some examples, musical instrument parameters 720 can deliberately be chosen to deviate from general parameters 710, or from the characteristics of the corresponding real object 622A. For instance, even though the dimensions of real object 622A might most closely resemble a floor tom drum, mixed reality system 612 might select musical instrument parameters 720 to correspond to a different type of drum, such as a conga drum; or a different instrument altogether, such as a crash cymbal.

In some examples, musical instrument parameters 720 may be determined based at least in part on information provided by a user (e.g., via a graphical or speech-driven user interface), or based on information from a database (e.g., a database of musical instrument types and parameters). For example, a user may use an interface to select that real object 622A should behave as a bongo drum in the MRE; or a database could indicate that real object 622A (or objects having similar dimensions) should correspond to a floor tom drum in the MRE. In some examples, mixed reality system 612 can determine musical instrument parameters 720 using sensor data. For example, a microphone of mixed reality system 612 could detect an audio signal corresponding to the real sound generated by a user striking real object 622A; and analyze that audio signal to determine musical instrument parameters 720 that correspond to that real sound. For instance, striking real object 622A could produce a sound with a high signal peak, short transients, and a rapid falloff; mixed reality system 720 could accordingly determine that corresponding virtual object 622B should have musical instrument parameters corresponding to a drum, which produces a sound having similar characteristics.

Referring back to process 500 shown in FIG. 5, in some examples, at stage 580, virtual objects may be visually presented to user 610, for example using a display of mixed reality system 612. Visual presentation of virtual objects may enhance a sense of immersion in a MRE, or a feeling of interactivity with that environment. For instance, in examples where virtual objects behave as virtual musical instruments, visual presentation of the virtual musical instruments can help sustain an illusion that user 610 is interacting with an actual musical instrument—not just a virtual facsimile.

Figure 8:
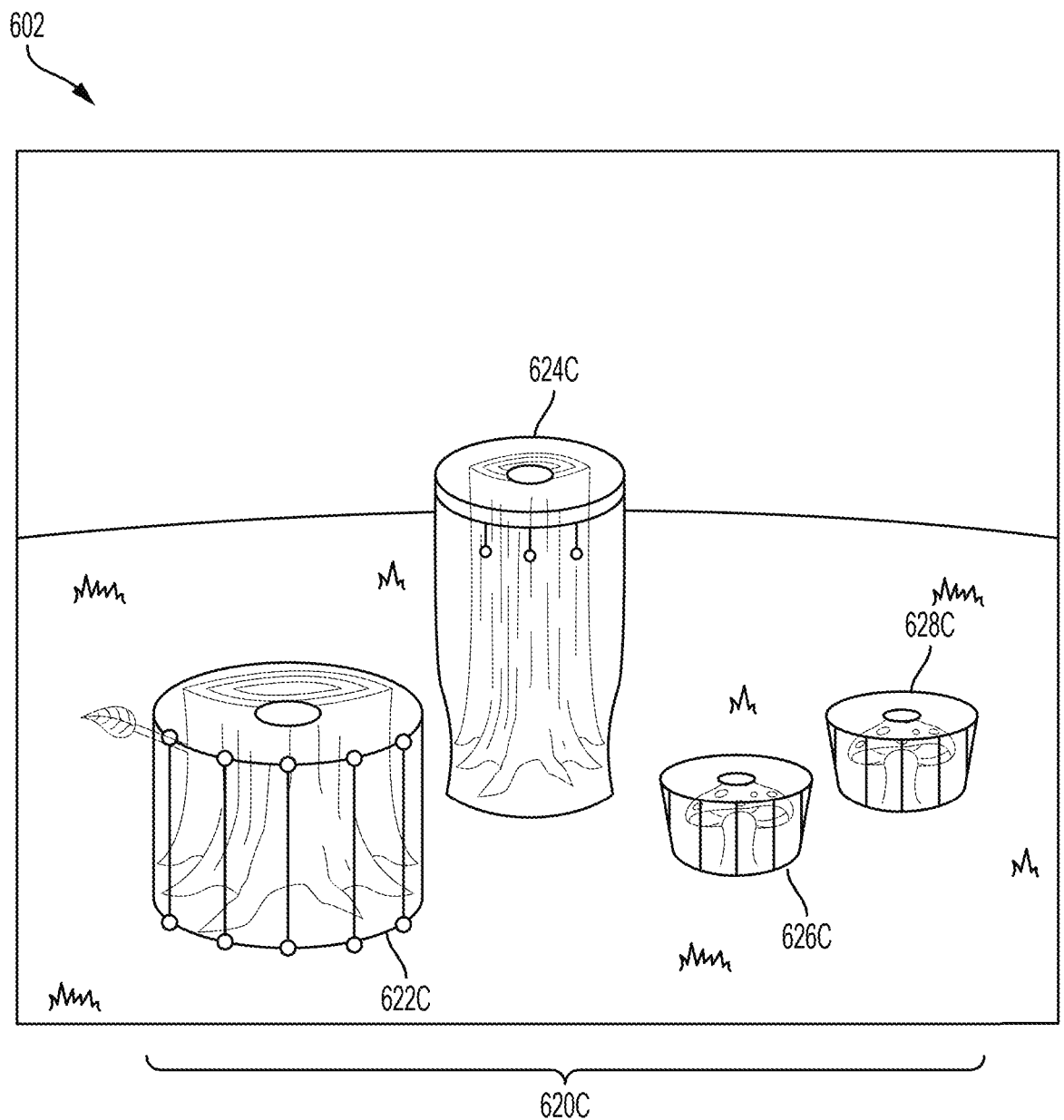
FIG. 8 illustrates an example presentation of a mixed reality environment.

FIG. 8 illustrates an example view of visual representations 622C, 624C, 626C, and 628C—corresponding to virtual objects 622B, 624B, 626B, and 628B, respectively presented simultaneously with real environment 600. The view shown in FIG. 8 may be a view visible to user 610 on a display of mixed reality system 612. As described above, mixed reality systems may include displays that are capable of presenting a view of a virtual environment simultaneously with a view of a real environment, and aligning the display of the virtual environment such that it corresponds to the view of the real environment (for example, such that virtual objects appear on top of real objects to which they correspond). For instance, in FIG. 8, visual representations 622C, 624C, 626C, and 628C overlap with their corresponding real objects 622A, 624A, 626A, and 628A, respectively—and may occlude those real objects (e.g., via active pixel occlusion by the display of mixed reality system 612). In some mixed reality systems, this presentation may be achieved using a camera which captures an image of the real environment for display, concurrent with a view of a virtual environment, on a conventional pixel display; and augments the image of the real environment with virtual content. In some mixed reality systems, the device incorporates a display with a transparent element, such that the display can present a view of a virtual environment, while the real environment is simultaneously visible to a user via the transparent element. Compared to devices using conventional pixel displays, which can convey a sense of detachment from the content displayed, devices that incorporate transparent displays can more fully immerse the user in the MRE.

Parameters associated with a virtual object, such as parameters 700, can be used to identify a visual appearance of the virtual object in a MRE. In FIG. 8, visual representations 622C, 624C, 626C, and 628C have the appearance of various types of drums that may be associated with virtual objects 622B, 624B, 626B, and 628B. For example, if virtual object 622B is associated with a parameter identifying it as a floor tom drum, as shown in FIG. 7, art assets (e.g., polygonal meshes, textures, particle effects, animation data) corresponding to a floor tom can be identified (e.g., in a memory of mixed reality system 612) and associated with a visual representation 622C of virtual object 622B, so as to give visual representation 622C the appearance of an actual floor tom. Similarly, visual representation 622C can be presented at a position and orientation in a MRE that corresponds to the position and orientation of virtual object 622B (which in turn corresponds to the position and orientation of real object 622A), in a view that incorporates a position and orientation of the user (which may correspond to a camera origin and axis in the MRE). Further, visual representation 622C may be based on other parameters associated with virtual object 622B, such as its color and transparency, or physical dimensions (e.g., radius, height). By basing the characteristics of visual representation 622C on the same parameters of virtual object 622B that are used for audio signal processing or generation, visual representation 622C may take on visual characteristics consistent with the audio signals associated with virtual object 622B. For instance, where parameters of virtual object 622B identify it as a floor tom with radius 14.0 inches, as in FIG. 7, that object can take on the appearance of a floor tom with radius 14.0 inches. Similarly, where the parameters of virtual object 622B are based on physical characteristics of corresponding real object 622A, which a user can physically touch and interact with, visual representation 622C can be consistent with those same physical characteristics. This consistency across the various senses—sight, sound, and touch—can more fully immerse a user in a MRE, and help to reduce cognitive dissonance effects experienced by users of some mixed reality environments.

Figure 9:
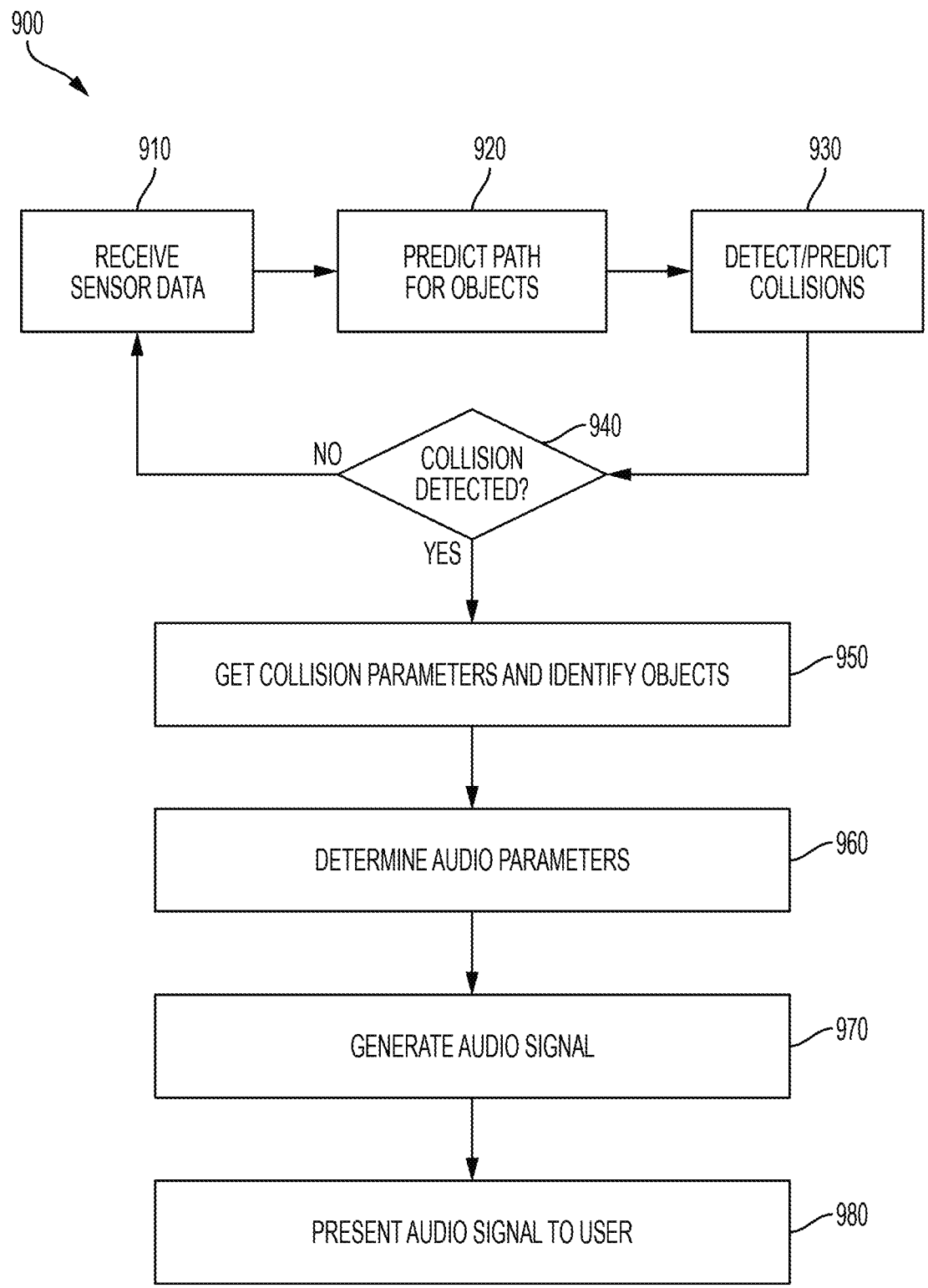
FIG. 9 illustrates an example flow chart for operating a mixed reality musical instrument in a mixed reality system.

Generating and Presenting an Audio Signal for a Mixed Reality Musical Instrument FIG. 9 shows an example process 900 for detecting input from a user; applying the input to a virtual musical instrument to determine an audio signal; and presenting the audio signal to the user. Process 900 could be implemented, for example, by a mixed reality system, such as mixed reality system 612 described above. Stages 910, 920, 930, and 940 of process 900 may comprise a loop in which mixed reality system 612 determines whether an object (real or virtual) is colliding with, or is about to collide with, a virtual object (e.g., a virtual musical instrument) in a MRE. If such a collision is detected, collision parameters (including the identity of the virtual object) can be determined (stage 950); audio parameters can be determined based on the collision parameters and the parameters of the virtual object (stage 960); and an audio signal can be generated in accordance with the audio parameters (stage 970). Finally, the audio signal can be presented to user 610 at stage 980, for example using one or more speakers. In some embodiments, the one or more speakers may be included in mixed reality system 612. In some embodiments, the one or more speakers may be external to mixed reality system 612. These stages are described in further detail below.

At stage 910 of process 900, mixed reality system 612 receives data from one or more sensors. This data could include data from any sensors associated with mixed reality system 612 (including a handheld controller of mixed reality system 612, such as handheld controller 300 described above with respect to FIG. 3). In some embodiments, this data may include data from sensors external to mixed reality system 612. Such sensors can include cameras; LIDAR units; accelerometers; acoustic sensors; infrared sensors; GPS units; or any other suitable sensor. This data may be indicative of positions, orientations, and/or motions of real objects in real environment 600. Such real objects may include limbs of user 610, or objects held by user 610 (e.g., handheld controller 300).

In some examples, it is insufficient for process 900 to detect (e.g., at stage 930) collisions that are actively occurring. This is because many systems exhibit latency in detecting collisions, and responding to such collisions by generating and presenting a corresponding audio signal. If this latency exceeds a threshold of human detectability (e.g., on the order of 10 milliseconds), user 610 may perceive an unnatural delay between actions in the real environment and audio responses in the MRE. Such delayed audio responses may deviate from real world behavior, and thus compromise the user's sense of immersion in the MRE. Accordingly, at stage 920, mixed reality system 612 can predict, based on the state of objects in the MRE and on the sensor data received at stage 910, future trajectories of real objects in real environment 600 over a prediction time interval. These trajectories can be used to predict imminent collisions. The length of the prediction time interval may depend on the degree of latency in generating and presenting an audio signal; the longer this latency, the greater the prediction time interval may need to be in order to avoid delayed audio responses. The degree of latency may depend in turn on factors such as the overall processing power of mixed reality system 612; the size and complexity of the MRE; and communication latencies, such as network latency, or latency associated with a handheld controller 300.

Positions and orientations of real objects in real environment 600 can be identified using conventional techniques. For example, such positions and orientations can be determined by a processor of mixed reality system 612 (such as described above with respect to FIG. 4), using data from sensors such as cameras, GPS units, and infrared sensors as input. For instance, in some examples, visual data from cameras can be used to detect edges and surfaces using conventional machine vision techniques. Further, in some examples, GPS data can provide an index into map data, such as map data that identifies nearby terrain or objects. By identifying positions and orientations at multiple points in time, higher-order motion characteristics such as velocity and acceleration can be calculated, and used as input to conventional trajectory calculations based on classical mechanics. Other suitable methods of predicting trajectories of real objects will be familiar.

In some examples, the trajectories predicted at stage 920 may also include trajectories of virtual objects, such as virtual objects associated with real objects in real environment 600. For example, a virtual "mallet" object could be associated with a user holding a handheld controller 300; for instance, a position and/or orientation of the virtual mallet could be linked to a position and/or orientation of the handheld controller 300 (as may be determined using sensors of handheld controller 300, for example as described above with respect to FIG. 3). By moving and rotating the handheld controller 300, the user may use the virtual mallet to "strike" a real object, such as real object 622A, in a MRE. Alternatively, in lieu of a mallet, another type of hand held musical instrument striker, such as a drumstick or a cymbal brush, may be provided. In some embodiments, the trajectories predicted at stage 920 may also include trajectories of real objects, such as real objects attached to or used in place of the handheld controller 300. The real objects may include, for example, real mallets, contact sensors, finger sensors, and the like. In some examples, if a real mallet is attached to the handheld controller 300, a position and/or orientation of the real mallet is linked to a position and/or orientation of the handheld controller 300. The position and/or orientation of the real mallet may be determined using one or more sensors of the real mallet and/or through a known relationship between the real mallet and the handheld controller 300. In some examples, if a real mallet is used in place of the handheld controller 300, a position and/or orientation of the real mallet may be determined using one or more sensors of the real mallet.

At stage 930, mixed reality system 612 determines, based on the predicted trajectories determined at stage 920, whether a collision between an object (real or virtual) and a virtual object in the MRE is imminent (e.g., that a collision will occur within the prediction time interval). This determination may be performed using conventional techniques, such as for determining whether a predicted trajectory intersects with a virtual object in the MRE.

Figure 10A:
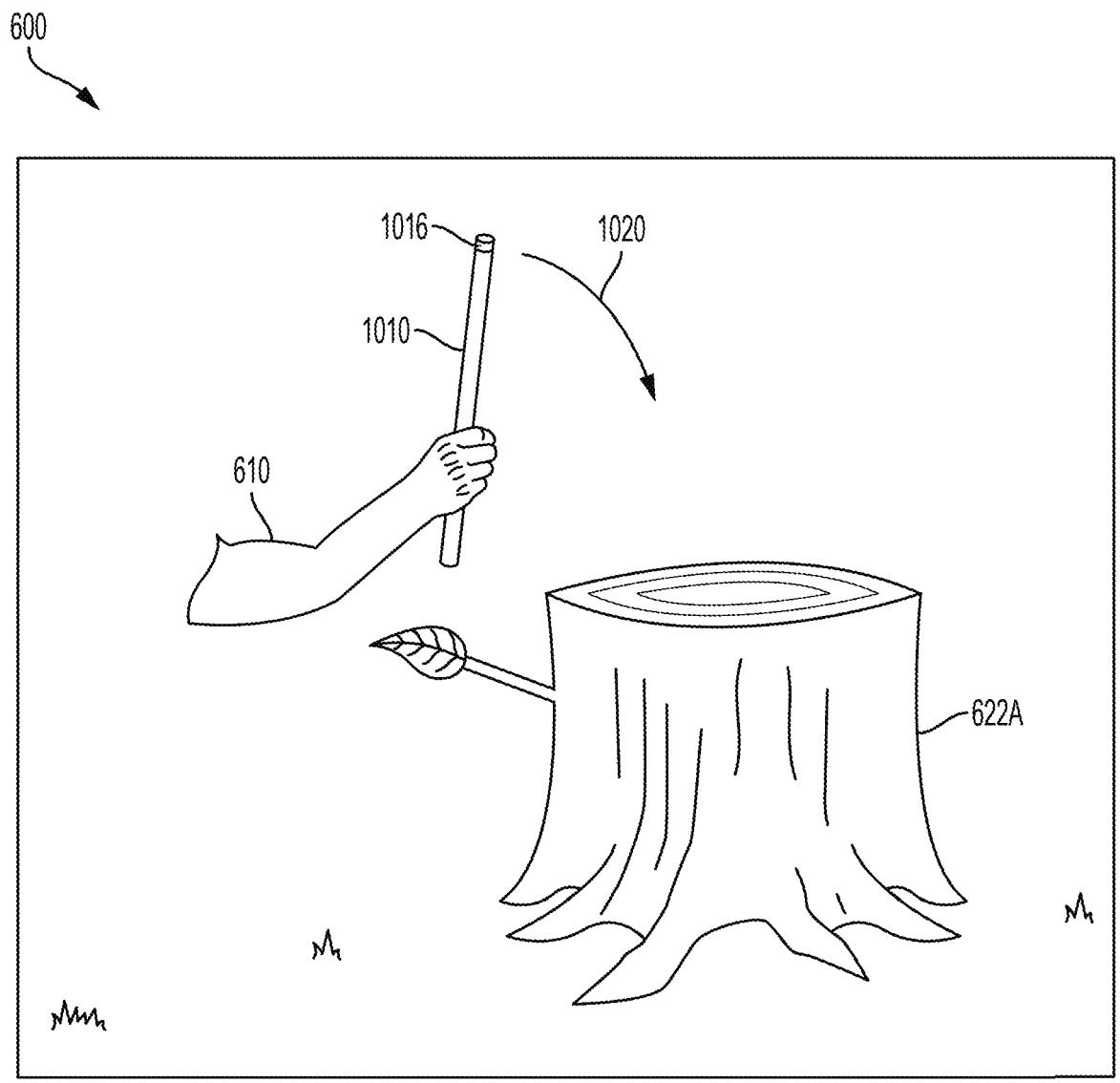
FIGS. 10A-10C illustrate an example of identifying collision parameters for a mixed reality musical instrument in a mixed reality system.
Figure 10B:
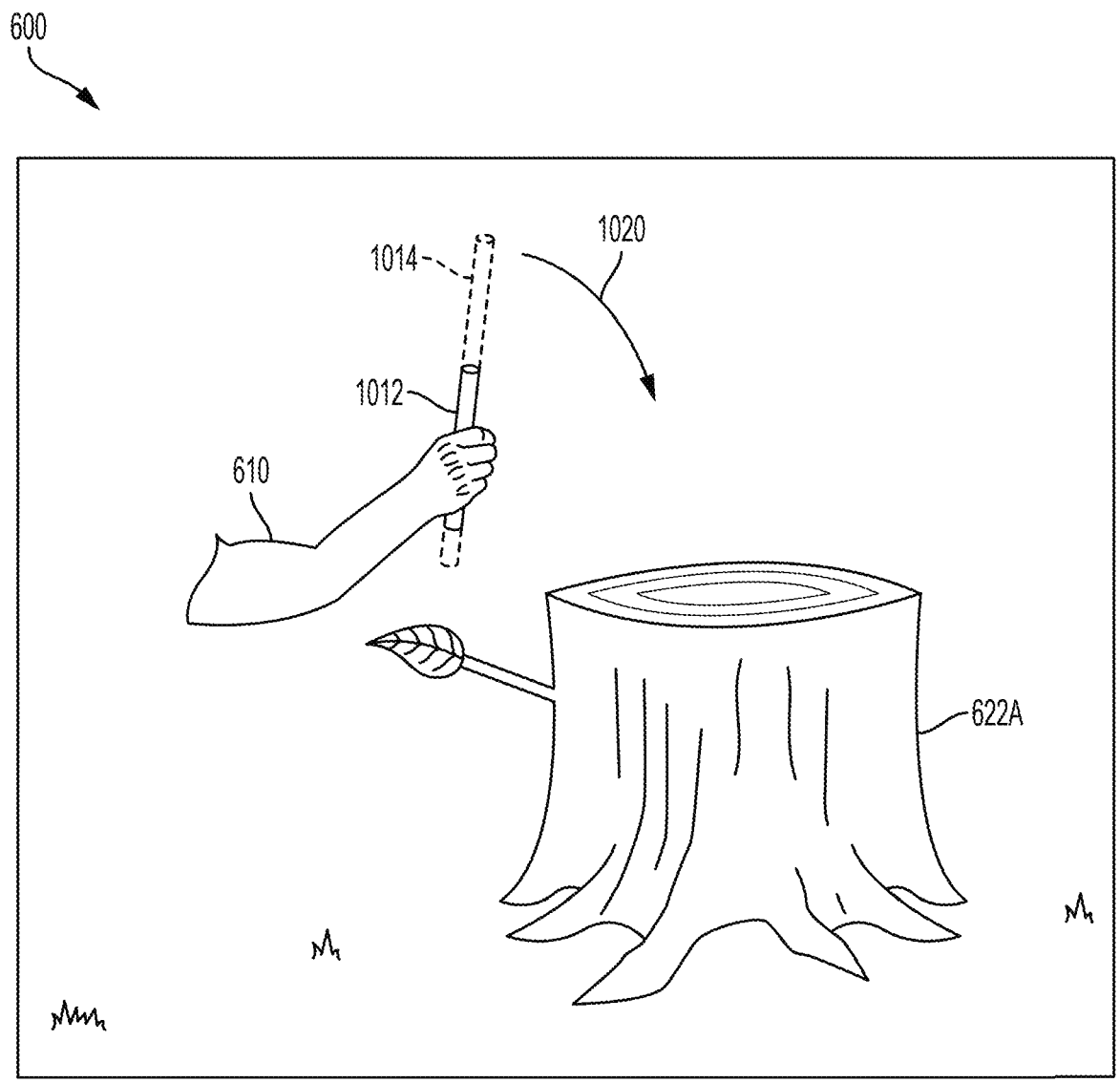
Figure 10C:
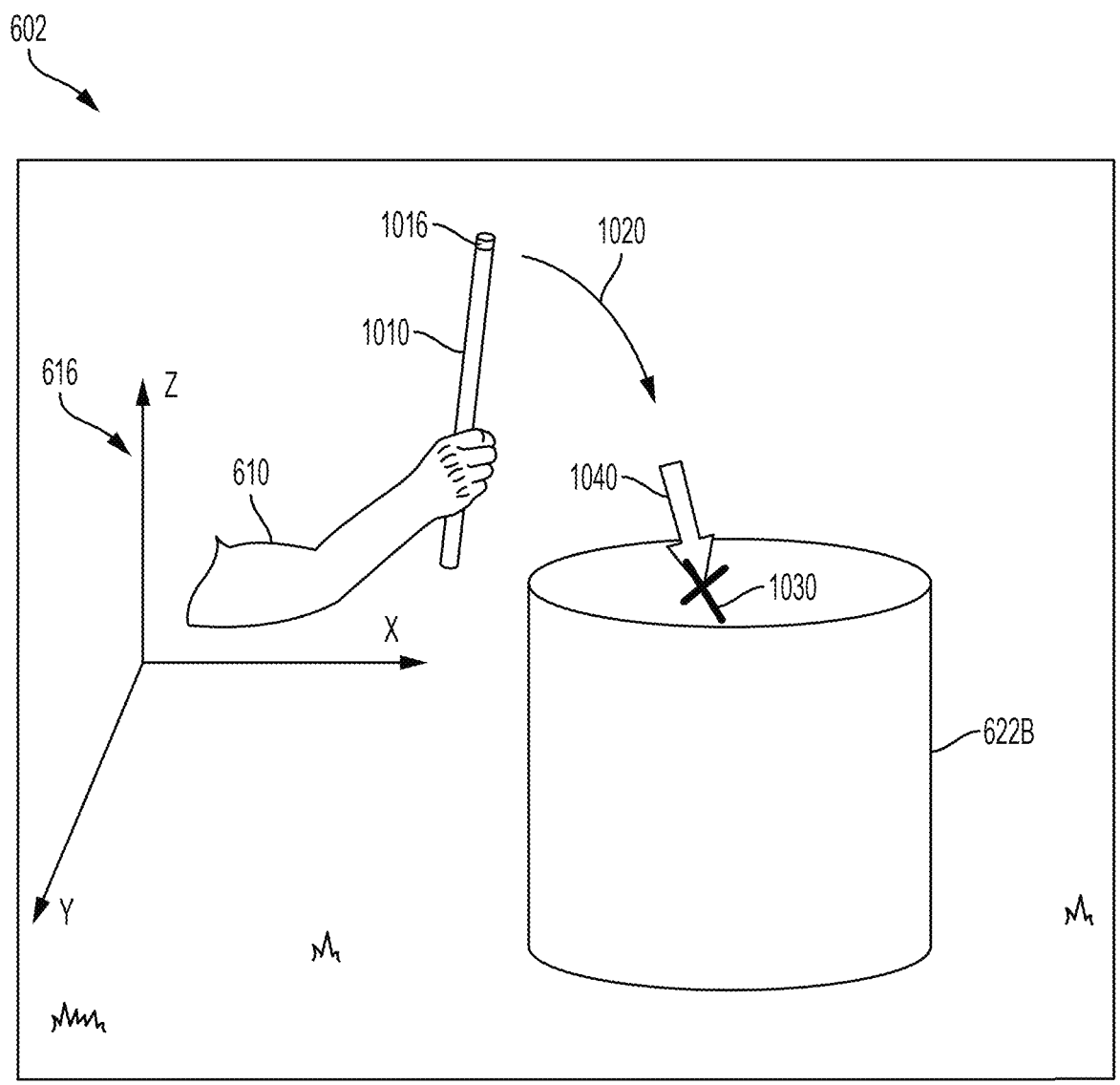

FIGS. 10A-10C illustrate an example of determining a collision with a mixed reality musical instrument according to aspects of process 900. FIG. 10A shows user 610 and real object 622A in real environment 600. User 610 carries a real object 1010 (e.g., a stick), and swings real object 1010 toward real object 622A in a direction 1020. FIG. 10B shows a variation in which user 610 carries a handheld controller 1012 (which may correspond to handheld controller 300, described above with respect to FIG. 3). In FIG. 10B, handheld controller 1012 corresponds to a virtual object 1014 (which may represent a virtual mallet) that is spatially linked to handheld controller 1012 in a MRE, and that thus moves in the MRE in accordance with handheld controller 1012. In FIG. 10B, user 610 swings both handheld controller 1012 and the linked virtual object 1014 toward real object 1010 in the direction 1020.

In some examples, such as shown in FIG. 10A, real object 1010 may include an impact detector 1016 configured to output a signal corresponding to a collision between real object 1010 and another real object, such as real object 622A. Impact detector 1016 may be any suitable switch or sensor that outputs a signal corresponding to a collision with real object 1010. In some examples, impact detector 1016 can be an switch (e.g., a single pole/single throw electrical switch) that outputs a signal corresponding to a state (e.g., open/closed) of the switch; for instance, if real object 1010 collides with another real object, the collision may close the switch and output a signal accordingly. In some examples, impact detector 1016 can include a sensor, such as an accelerometer for detecting an acceleration of real object 1010, which acceleration can correspond to a collision of real object 1010 with another real object. In some examples, impact detector 1016 can include circuitry configured to detect when an output of a sensor of impact detector 1016 exceeds a predefined threshold, and to output a signal accordingly.

FIG. 10C illustrates a mixed reality system, such as mixed reality system 612, determining a collision with virtual object 622B, which corresponds to real object 622A, in a MRE 601. As described above with respect to stage 910 of process 900, mixed reality system 612 can receive sensor data identifying the positions, orientations, and motions of user 610, real object 1010 (or handheld controller 1012 and corresponding virtual mallet 1014). For example, mixed reality system 612 can use camera data (e.g., as input into machine vision algorithms for detecting edges and surfaces)

to identify that real object 1010 is moving in direction 1020, at a particular velocity, and can therefore be expected to collide with virtual object 622B at location 1030 with direction vector 1040. (Similarly, mixed reality system 612 can use accelerometer data, IMU data, or optical tracking data from handheld controller 1012 to identify that virtual mallet 1014 is moving in direction 1020, at a particular velocity, and can be expected to collide with virtual object 622B at a particular location with a particular direction vector.) Mixed reality system 612 can similarly identify other collision parameters, such as the expected impact force and momentum. Further, in some examples, as described above, real object 1010 can include an impact detector 1016 configured to generate a signal corresponding to a collision between real object 1010 and another real object, such as real object 622A.

Referring back to process 900, at stage 940, in accordance with a determination at stage 930 that no collision is imminent, process 900 may return to stage 910, at which updated sensor data input will be received. In accordance with a determination at stage 940 that a collision is imminent, process 900 may proceed to stage 950, at which collision parameters (e.g., projected time of impact, point of impact, force vector of impact, mass of colliding objects) may be determined for the collision such as described above. These collision parameters can include the identity of, and parameters associated with, one or more real or virtual objects involved in the collision. For instance, with reference to FIGS. 10A-10C, collision parameters could include the location of impact point 1030 in the MRE; the direction vector 1040; physical parameters (e.g., mass, dimensions) corresponding to real object 1010 and/or real object 622A; and/or virtual parameters (e.g., mass, dimensions) corresponding to virtual mallet 1014.

At stage 960, audio parameters can be determined based on the collision parameters identified at stage 950, and based on the parameters associated with the virtual object being collided with (e.g., parameters 700, described above). These audio parameters can be used at stage 970 to generate an audio signal for the virtual object. The audio parameters determined at stage 960 can include any parameters relating to generation of an audio signal; the specific audio parameters used will depend on the means by which an audio signal is to be generated. For example, such audio parameters may include pitch, velocity, and timbre (e.g., for examples in which an audio signal is generated using a sound engine); an identity of one or more base tones and envelope parameters (e.g., for examples in which an audio signal is generated using a waveform synthesizer); an identity of one or more audio samples (e.g., for examples in which an audio signal is generated by playing back a sample). Audio parameters may additionally include various parameters for processing an audio signal, such as gain and attenuation parameters for performing gain-based signal processing; an equalization curve for performing frequency-based signal processing; reverberation parameters for applying artificial reverb and echo effects; and voltage-controlled oscillator (VCO) parameters for applying time-based modulation effects.

Audio parameters may be determined at stage 960 using any suitable technique. Some audio parameters may be determined based on the relative positions and orientations of the user of the MRE, and of the source of the audio signal in the MRE (e.g., the real or virtual objects to which the audio signal corresponds). For example, an audio parameter corresponding to an overall volume of an audio signal can be determined based on the distance between the user and the virtual object (reflecting that the perceived volume of an audio signal decreases as the distance between the listener and the source increases). Audio parameters typically will be determined so as to simulate the audio signal that would be heard by a listener at the user's position and orientation in the MRE, relative to the source of the audio signal in the MRE.

Audio parameters may additionally be generated from musical instrument parameters, such as musical instrument parameters 720 shown in FIG. 7. For example, musical instrument parameters 720 indicate that virtual object 622B corresponds to a floor tom-type drum with oak shells. Mixed reality system 612 could accordingly determine audio parameters (e.g., timbre, equalization curve) that correspond to the acoustic properties of a floor tom-type drum with oak shells. Similarly, musical instrument parameters 720 indicate that virtual object 622B has a pitch of 69.3 Hz; mixed reality system 612 could accordingly determine a pitch audio parameter to correspond to that particular pitch. Real objects can also affect audio parameters; for example, a virtual drum can generate different tones depending on the characteristics (e.g., materials) of the real object with which it is struck.

Audio parameters may further be generated from collision parameters. For example, an audio parameter specifying a start time of the audio signal should correspond with the time at which the collision is predicted to occur. Additionally, the amplitude of the audio signal may depend on the velocity with which a user strikes a virtual musical instrument (e.g., as determined by sensors such as cameras 142 and 144); similarly, the pitch of the audio signal may depend on the location (e.g., location 1030 in FIG. 10C) at which the user contacts the virtual musical instrument; and the timbre of the audio signal may depend on the direction vector at which the user contacts the virtual musical instrument. Some collision parameters can be identified from sensors of mixed reality system 612 (e.g., cameras) as described above. For example, cameras can be used as input to machine vision algorithms to determine a location, direction, and velocity of a collision with a virtual musical instrument. In some embodiments, some collision parameters may be identified from sensors external to mixed reality system 612. Audio parameters (e.g., amplitude, pitch, timbre) can accordingly be generated from these values. In some examples, an audio parameter may be generated from a musical instrument parameter that depends on a collision parameter; for instance, the pitch of a note from a virtual piano may depend on the specific location (e.g., the specific piano key) that is struck by the user, and may be determined, for example, based on contact sensors, finger sensors, and the like.

At stage 970, an audio signal can be generated according to the audio parameters determined at stage 960. Any suitable technique can be used for generating an audio signal. In some examples, a sound engine may be used to generate the audio signal, for example according to audio parameters for pitch and velocity, and an audio parameter identifying a MIDI instrument to be used in the signal generation. In some examples, a waveform synthesis engine may be used to generate the audio signal, using conventional audio synthesis techniques, based on audio parameters such as pitch, envelope parameters, and an identity of one or more base tones. In some examples, the audio signal may be generated by playing one or more prerecorded audio samples, based on audio parameters (e.g., pitch, timbre) that may serve as an index into a database of audio samples.

In some examples, at stage 970, the generated audio signal can be further processed, for example in real time, according to one or more musical instrument parameters. For instance, audio parameters corresponding to a filter (e.g., a low pass filter) could be used to apply such a filter to the generated audio signal. Similarly, audio parameters may correspond to processing or effects (e.g., gain-based signal processing; frequency-based signal processing (e.g., filtering); artificial reverb and time delay (e.g., echo) effects; and time-based modulation effects, as described above), and may be used to apply such processing or effects to the generated audio signal.

In some examples, at stage 970, the generated audio signal can further be processed to take into account the position or orientation of the user, the virtual musical instrument, or other real and virtual objects, in the MRE. For instance, if a user is oriented away from the source of the audio signal in the MRE, or ducks behind a real or virtual object in the MRE, a filter may be applied to the audio signal to reflect that the audio signal should accordingly have different frequency characteristics. Additionally, spatialization may be applied to the audio signal. Spatialization may be applied by using Head Related Transfer Functions (HRTFs). HRTFs include left and right filter functions that are dependent on the angular, or angular plus radial (spherical) coordinates of the sound source relative to the user. Separate components (e.g., drums in a drum set) or separate keys (e.g., keys of a xylophone) can have different angular coordinates relative to the user, and different HRTFs can be selected accordingly for the different components or keys.

Finally, at stage 980, the generated and/or processed audio signal can be presented to user 610 via one or more speakers. In some embodiments, the one or more speakers may be included in mixed reality system 612. In some embodiments, the one or more speakers may be external to mixed reality system 612. In some examples, mixed reality system 612 may include functionality for mixing the audio signal with other audio signals from the MRE.

Throughout the disclosure, including example process 900, an audio signal is contemplated to include not only mono audio signals, but also stereo (and other multichannel) audio signals. For instance, in examples where mixed reality system 612 features left and right speakers (positioned near the left and right ears, respectively, of user 612), a stereo audio signal comprising a left channel and a right channel may be generated, with the left channel presented to the left ear (via the left speaker) and the right channel presented to the right ear (via the right speaker). Similarly, in examples where left and right speakers are external to mixed reality system 612, a stereo audio signal including a left channel and a right channel may be generated with the left channel presented at the left speaker and the right channel presented at the right speaker.

Some examples of the disclosure are directed to a method comprising: identifying a first real object in a mixed reality environment, the mixed reality environment having a user; identifying a second real object in the mixed reality environment; generating, in the mixed reality environment, a first virtual object corresponding to the second real object; identifying, in the mixed reality environment, a collision between the first real object and the first virtual object; determining a first attribute associated with the collision; determining, based on the first attribute, a first audio signal corresponding to the collision; and presenting to the user, via a first speaker, the first audio signal. Additionally or alternatively to one or more of the examples disclosed above, in some examples, identifying the collision comprises predicting a collision based on a position of the first real object and a velocity of the first real object. Additionally or alternatively to one or more of the examples disclosed above, in some examples, the first attribute is a pitch associated with the virtual object, and determining a first audio signal comprises generating an audio signal corresponding to the pitch. Additionally or alternatively to one or more of the examples disclosed above, in some examples, the first attribute comprises a material associated with the virtual object, and determining the first audio signal comprises: generating an audio signal, and modifying the audio signal based on an acoustic property of the material. Additionally or alternatively to one or more of the examples disclosed above, in some examples, the method further comprises presenting, concurrently on a display, the virtual object and a view of the second real object. Additionally or alternatively to one or more of the examples disclosed above, in some examples, the first real object comprises a sensor, and identifying the collision comprises predicting a collision based on an output of the sensor. Additionally or alternatively to one or more of the examples disclosed above, in some examples, determining the first audio signal comprises: generating a MIDI parameter based on the first attribute; and generating, using a sound engine, the first audio signal based on the MIDI parameter.

Some examples of the disclosure are directed to a method comprising: identifying a first real object in a mixed reality environment, the mixed reality environment having a user; identifying a second real object in the mixed reality environment; generating, in the mixed reality environment, a first virtual object corresponding to the first real object; generating, in the mixed reality environment, a second virtual object corresponding to the second real object; identifying, in the mixed reality environment, a collision between the first virtual object and the second virtual object; determining a first attribute associated with the collision; determining, based on the first attribute, a first audio signal corresponding to the collision; and presenting to the user, via a first speaker, the first audio signal.

Some examples of the disclosure are directed to a system comprising: a wearable head device including: a display for displaying a virtual environment, the display comprising a transmissive eyepiece through which a real environment is visible; and a speaker; and one or more processors configured to perform: identifying a first real object in the real environment; identifying a second real object in the real environment; generating, in the virtual environment, a first virtual object corresponding to the second real object; identifying, in the virtual environment, a collision between the first real object and the first virtual object; determining a first attribute associated with the collision; determining, based on the first attribute, a first audio signal corresponding to the collision; and presenting, to a user of the wearable head device, via the speaker, the first audio signal. Additionally or alternatively to one or more of the examples disclosed above, in some examples, identifying the collision comprises predicting a collision based on a position of the first real object and a velocity of the first real object. Additionally or alternatively to one or more of the examples disclosed above, in some examples, the first attribute is a pitch associated with the virtual object, and determining a first audio signal comprises generating an audio signal corresponding to the pitch. Additionally or alternatively to one or more of the examples disclosed above, in some examples, the first attribute comprises a material associated with the virtual object, and determining the first audio signal comprises: generating an audio signal, and modifying the audio signal based on an acoustic property of the material. Additionally or alternatively to one or more of the examples disclosed above, in some examples, the one or more processors are further configured to present, concurrently on the display, the virtual object and a view of the second real object. Additionally or alternatively to one or more of the examples disclosed above, in some examples, the first real object comprises a sensor, and identifying the collision comprises predicting a collision based on an output of the sensor. Additionally or alternatively to one or more of the examples disclosed above, in some examples, determining the first audio signal comprises: generating a MIDI parameter based on the first attribute; and generating, using a sound engine, the first audio signal based on the MIDI parameter. Additionally or alternatively to one or more of the examples disclosed above, in some examples, the wearable head device further includes a sensor, and the first attribute is determined based on an output of the sensor.

Some examples of the disclosure are directed to a system comprising: a wearable head device including: a display for displaying a virtual environment, the display comprising a transmissive eyepiece through which a real environment is visible; and a speaker; and one or more processors configured to perform: identifying a first real object in the real environment; identifying a second real object in the real environment; generating, in the virtual environment, a first virtual object corresponding to the first real object; generating, in the virtual environment, a second virtual object corresponding to the second real object; identifying, in the virtual environment, a collision between the first virtual object and the second virtual object; determining a first attribute associated with the collision; determining, based on the first attribute, a first audio signal corresponding to the collision; and presenting to a user of the wearable head device, via the speaker, the first audio signal.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A method comprising:
   identifying a first real object in a mixed reality environment, the mixed reality environment having a user;
   identifying a second real object in the mixed reality environment;
   generating, in the mixed reality environment, a first virtual object corresponding to the second real object;
   identifying, in the mixed reality environment, a collision between the first real object and the first virtual object;
   determining a first attribute associated with the collision;
   determining, based on the first attribute, a first audio signal corresponding to the collision; and
   presenting to the user, via a first speaker, the first audio signal,
   wherein:
   the first real object comprises a sensor, and
   identifying the collision comprises predicting the collision based on an output of the sensor.

2. The method of claim 1, wherein predicting the collision is further based on a position of the first real object and a velocity of the first real object.

3. The method of claim 1, wherein the first attribute comprises a pitch associated with the first virtual object, and determining the first audio signal comprises determining an audio signal corresponding to the pitch.

4. The method of claim 1, wherein the first attribute comprises a material associated with the first virtual object, and determining the first audio signal comprises
   modifying an audio signal based on an acoustic property of the material.

5. The method of claim 1, further comprising presenting, concurrently on a display of a wearable head device, the first virtual object and a view of the second real object.

6. The method of claim 1, wherein determining the first audio signal comprises:
   generating a MIDI parameter based on the first attribute; and
   determining, using a sound engine, the first audio signal based on the MIDI parameter.

7. The method of claim 1, further comprising:
   identifying a third real object in the mixed reality environment;
   generating, in the mixed reality environment, a second virtual object corresponding to the third real object;
   identifying, in the mixed reality environment, a collision between the first virtual object and the second virtual object;
   determining a second attribute associated with the collision between the first virtual object and the second virtual object;
   determining, based on the second attribute, a second audio signal corresponding to the collision between the first virtual object and the second virtual object; and
   presenting to the user, via the first speaker, the second audio signal.

8. The method of claim 1, wherein determining the first attribute comprises determining the first attribute based on an output of a sensor of a wearable head device.

9. A system comprising:
   a wearable head device including:
      a display for displaying a mixed reality environment; and
      a speaker; and
   one or more processors configured to perform:
      identifying a first real object in the mixed reality environment;
      identifying a second real object in the mixed reality environment;
      generating, in the mixed reality environment, a first virtual object corresponding to the second real object;
      identifying, in the mixed reality environment, a collision between the first real object and the first virtual object;
      determining a first attribute associated with the collision;
      determining, based on the first attribute, a first audio signal corresponding to the collision; and
      presenting, to a user of the wearable head device, via the speaker, the first audio signal,
   wherein:
   the first real object comprises a sensor, and
   identifying the collision comprises predicting the collision based on an output of the sensor.

10. The system of claim 9, wherein predicting the collision is further based on a position of the first real object and a velocity of the first real object.

11. The system of claim 9, wherein the first attribute comprises a pitch associated with the first virtual object, and determining the first audio signal comprises determining an audio signal corresponding to the pitch.

12. The system of claim 9, wherein the first attribute comprises a material associated with the first virtual object, and determining the first audio signal comprises:
   modifying an audio signal based on an acoustic property of the material.

13. The system of claim 9, the one or more processors further configured to perform presenting, concurrently on the display, the first virtual object and a view of the second real object.

14. The system of claim 9, wherein determining the first audio signal comprises:
   generating a MIDI parameter based on the first attribute; and
   determining, using a sound engine, the first audio signal based on the MIDI parameter.

15. The system of claim 9, wherein the wearable head device further includes a second sensor, and determining the first attribute comprises determining the first attribute based on an output of the second sensor.

16. The system of claim 9, the one or more processors further configured to perform:
   identifying a third real object in the mixed reality environment;
   generating, in the mixed reality environment, a second virtual object corresponding to the third real object;
   identifying, in the mixed reality environment, a collision between the first virtual object and the second virtual object;
   determining a second attribute associated with the collision between the first virtual object and the second virtual object;
   determining, based on the second attribute, a second audio signal corresponding to the collision between the first virtual object and the second virtual object; and
   presenting, to the user, via the speaker, the second audio signal.

17. A non-transitory computer-readable medium containing instructions which, when executed by one or more processors cause the one or more processors to perform a method comprising:
   identifying a first real object in a mixed reality environment, the mixed reality environment having a user;
   identifying a second real object in the mixed reality environment;
   generating, in the mixed reality environment, a first virtual object corresponding to the second real object;
   identifying, in the mixed reality environment, a collision between the first real object and the first virtual object;
   determining a first attribute associated with the collision;
   determining, based on the first attribute, a first audio signal corresponding to the collision; and
   presenting to the user, via a first speaker, the first audio signal,
wherein:
   the first real object comprises a sensor, and
   identifying the collision comprises predicting the collision based on an output of the sensor.

18. The non-transitory computer-readable medium of claim 17, wherein predicting the collision is further based on a position of the first real object and a velocity of the first real object.

19. The non-transitory computer-readable medium of claim 17, the method further comprising presenting, concurrently on a display of a wearable head device, the first virtual object and a view of the second real object.

20. The non-transitory computer-readable medium of claim 17, the method further comprising:
   identifying a third real object in the mixed reality environment;
   generating, in the mixed reality environment, a second virtual object corresponding to the third real object;
   identifying, in the mixed reality environment, a collision between the first virtual object and the second virtual object;
   determining a second attribute associated with the collision between the first virtual object and the second virtual object;
   determining, based on the second attribute, a second audio signal corresponding to the collision between the first virtual object and the second virtual object; and
   presenting, to the user, via the first speaker, the second audio signal.

* * * * *